(12) United States Patent
Akiyama et al.

(10) Patent No.: US 8,044,142 B2
(45) Date of Patent: Oct. 25, 2011

(54) POLYPHENYLENE SULFIDE RESIN COMPOSITION

(75) Inventors: Yoshikuni Akiyama, Sodegaura (JP); Minoru Sakata, Sodegaura (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 262 days.

(21) Appl. No.: 11/664,870

(22) PCT Filed: Sep. 21, 2005

(86) PCT No.: PCT/JP2005/017335
§ 371 (c)(1),
(2), (4) Date: Apr. 6, 2007

(87) PCT Pub. No.: WO2006/067902
PCT Pub. Date: Jun. 29, 2006

(65) Prior Publication Data
US 2008/0085963 A1  Apr. 10, 2008

(30) Foreign Application Priority Data

Dec. 21, 2004 (JP) ................ 2004-368979

(51) Int. Cl.
*C08L 53/00* (2006.01)
*C08L 9/00* (2006.01)
*C08L 47/00* (2006.01)
*C08L 71/12* (2006.01)
*C08L 37/00* (2006.01)
*C08L 69/00* (2006.01)
*C08L 41/00* (2006.01)
*C08L 73/00* (2006.01)
*C08F 8/00* (2006.01)
*C08F 283/08* (2006.01)
*C08G 64/16* (2006.01)

(52) U.S. Cl. ............ 525/88; 525/98; 525/132; 525/208; 524/508; 524/611

(58) Field of Classification Search ................ 524/508, 524/611; 525/88, 98, 132, 208
See application file for complete search history.

(56) References Cited

U.S. PATENT DOCUMENTS

| 5,635,570 | A | | 6/1997 | Abe et al. |
| 6,211,268 | B1 | * | 4/2001 | Matsumura et al. ......... 524/100 |
| 7,173,090 | B2 | * | 2/2007 | Akiyama et al. ............ 525/88 |

FOREIGN PATENT DOCUMENTS

| JP | 59-209644 A | | 11/1984 |
| JP | 60-1241 A | | 1/1985 |
| JP | 63-205358 A | | 8/1988 |
| JP | 1-213359 A | | 8/1989 |
| JP | 6-322271 A | | 11/1994 |
| JP | 09087518 A | * | 3/1997 |
| JP | 9-157525 A | | 6/1997 |
| JP | 9-161737 A | | 6/1997 |
| JP | 10-53706 A | | 2/1998 |
| JP | 11-106655 A | | 4/1999 |
| JP | 11-158374 A | | 6/1999 |
| JP | 11-228829 A | | 8/1999 |
| JP | 2000-265060 A | | 9/2000 |
| JP | 2001-98151 A | | 4/2001 |
| JP | 2001-294751 A | | 10/2001 |
| JP | 2001-302916 A | | 10/2001 |
| JP | 2002-12764 A | | 1/2002 |
| JP | 2002-69298 A | | 3/2002 |
| JP | 2002-121383 A | | 4/2002 |
| JP | 2002-129014 A | | 5/2002 |
| JP | 2002-179915 A | | 6/2002 |
| JP | 2004-161947 A | | 6/2004 |
| JP | 2004217784 A | * | 8/2004 |
| JP | 2004-269664 A | | 9/2004 |
| JP | 2005-264124 A | | 9/2005 |
| WO | WO 03/035760 | * | 5/2003 |

OTHER PUBLICATIONS

European Search Report for application No. 05785205.5, dated Oct. 7, 2009 (4 pages).

* cited by examiner

*Primary Examiner* — Mark Eashoo
*Assistant Examiner* — Angela C Scott
(74) *Attorney, Agent, or Firm* — Birch, Stewart, Kolasch & Birch, LLP

(57) ABSTRACT

This invention provides a polymer alloy comprising a polyphenylene sulfide resin and a polyphenylene ether resin. This polymer alloy can eliminate molding whitening which, upon molding, occurs on the surface of the molded product, can impart excellent surface appearance and flame retardance, and further can improve balance between heat resistance and toughness (impact strength) and mechanical strength. The resin composition comprises 45 to 99 parts by weight of a polyphenylene sulfide resin comprising (a) 0 to 96% by weight of a specific linear polyphenylene sulfide resin and (b) 100 to 4% by weight of a specific crosslinking-type polyphenylene sulfide resin. The resin composition further comprises (c) 55 to 1 part by weight of a polyphenylene ether resin. Further, the resin composition comprises (d) 1 to 20 parts by weight, based on 100 parts by weight in total of components (a) to (c), of a styrene copolymer and/or an ethylene copolymer containing any one functional group of glycidyl and oxazolyl groups.

18 Claims, No Drawings

POLYPHENYLENE SULFIDE RESIN COMPOSITION

TECHNICAL FIELD

The present invention relates to a resin composition which provides a molded article that is free from whitening on the surface, exhibits excellent surface appearance and inflammability, and has excellent heat resistance and a balance between toughness (impact strength) and mechanical strength when molded. The present invention also relates to a process for preparing the same.

BACKGROUND ART

Polyphenylene sulfide resins, one of highly heat-resistant crystalline resins, have been utilized in the form of a blend with fillers, such as glass fiber, as resin molding materials excellent in heat resistance, chemical resistance, stiffness and inflammability for electrical/electronic/OA components or automotive electronic components.

Particularly in optical pick-up bases contained in compact disc drives or optical housings of copiers as one of mechanical components for optical instruments, which have been produced by metal die casting using aluminum, zinc or the like, there has been a trend in recent years toward conversion of metals to resins from the viewpoint of decrease in weight and increase in productivity of optical instruments. And polyphenylene sulfide resin compositions have come into use most frequently.

However, it is well known that, though polyphenylene sulfide resins have excellent heat resistance and workability, they may give rise to many problems when molded, such as corroding the metal of molds because of the resins being fused in oxygen atmosphere at high temperature during molding, causing stain-like burns on the surface of molds or molded articles or tar-like matter to adhere to the same with the progress of gasification, and in molds having welded joints, causing whitened appearance on the periphery of the welded joints of black colored molded articles when venting deteriorates. The same is true for the polymer alloys that are composed of polyphenylene sulfide and polyphenylene ether.

And besides, in the polymer alloys composed of polyphenylene sulfide and polyphenylene ether, allowing the polyphenylene sulfide to contain polyphenylene ether makes it possible for them to have the advantage of inhibiting flash from occurring during molding, but on the other hand, it also causes a phenomenon, a disadvantage, particularly in the polymer alloys containing inorganic filler that their inflammability extremely deteriorates.

For the polyphenylene sulfide resin compositions having the above described problems, especially the problems of corroding the metal of molds during molding, causing stain-like burns on the surface of molds or molded articles or tar-like matter to adhere to the same with the progress of gasification, and in molds having welded joints, causing whitened appearance on the periphery of the welded joints of black colored molded articles, there have been proposed a number of improvements and ideas in terms of the materials.

As techniques for the above described improvements and ideas, there have been proposed compositions prepared by blending a polyphenylene sulfide resin with an inorganic gas-scavenger (refer to, for example, Patent Documents 1 to 3). Further, to produce effects of preventing tar-like matter to adhere to molds during molding and of improving the appearance resulted from the gasification, there have been proposed resin compositions composed of polyphenylene sulfide and a specific compound or inorganic filler (refer to, for example, Patent Documents 4 to 6).

These documents disclose attempts to overcome the disadvantages of polyphenylene sulfide resins as base materials by blending the resins with additives. In other words, they disclose attempts to improve the appearance of molded articles by preventing the metal surface of molds from corroding, stain-like burns from being produced on the surface of molds or molded articles and tar-like matter from adhering to the same. However, these methods are no more than means of masking the causative substances, and when molding is performed for a long time under molding conditions where venting is poor, molded articles have extremely deteriorated appearance because stain-like burnings are still produced particularly on the welded joints or their periphery and whitening phenomenon occurs on the black-colored parts. Thus, the actual situation is that molded articles produced by such methods still have a number of problems unsolved.

It is also known, as another problem, that molding polyphenylene sulfide resins involves production of significant flash on the resultant molded articles. This is one of the factors that decrease the productivity/economy in the industrial production of parts.

Polyphenylene sulfide resins are classified into two types, linear (straight chain) and crosslinked (including semi-crosslinked), depending on production process. The latter ones, crosslinked polyphenylene sulfide resins, are thermoplastic resins prepared by producing the former ones, linear polyphenylene sulfide resins, by polymerization and heat treating the linear polyphenylene sulfide resins at temperatures equal to or lower than the melting point of polyphenylene sulfide resins in the presence of oxygen to accelerate the oxidation crosslinking so that the molecular weight and viscosity of the polymer are appropriately increased. They are superior to linear polyphenylene sulfide resins in mechanical strength and heat resistance, but have the disadvantage of being inferior in toughness. On the other hand, in linear polyphenylene sulfide resins superior in toughness, their molecular chain length is hard to increase, due to technological restriction in polymerization, and therefore improvements in mechanical strength and heat resistance cannot be desired. Besides, they have the problem of being more likely to cause flash during the molding.

It is well known that flash on molding is more likely to occur in polyphenylene sulfide resins than in amorphous thermoplastic resins, though there is a little difference between linear ones and crosslinked ones.

Optical pick-up bases contained in compact disc drives or optical housings of copiers as one of mechanical components for optical instruments have been produced by metal die casting using aluminum, zinc or the like; however, in recent years, progress toward the conversion of metals to resins is being made from the viewpoint of decrease in weight and increase in productivity of optical instruments. And in terms of the conversion of metals to resins, materials are needed which provide resin molded articles with high heat resistance and high dimensional accuracy with respect to temperature change and are less likely to cause flash during molding.

Thus, for polyphenylene sulfide resin compositions, as raw materials for the molded articles for the above described applications, there have been proposed a number of improvements and ideas in terms of their materials. To inhibit the occurrence of flash, a big problem caused during molding, a number of techniques have been proposed in which polymer alloys are formed using a polyphenylene sulfide resin as a crystalline resin and a polyphenylene ether resin as an amorphous resin.

As such techniques, proposed are, for example, resin compositions which are composed of: a resin component of polyphenylene sulfide and polyphenylene ether; a specific inorganic compound; a fibrous filler; and other inorganic filler and which are less likely to cause flash during molding and have high stiffness and high dimensional accuracy (referrer to, for example, Patent Documents 7 to 8). To obtain the similar effects, resin compositions are also proposed which are composed of: a resin component of polyphenylene sulfide and polyphenylene ether; a silane coupling agent; a fibrous filler; and other inorganic filler (refer to, for example, Patent Documents 9 to 10). Further, to obtain a resin composition that allows the deviation of optical axis to be kept small when molded into optical components (refer to Patent Document 11), a resin composition is proposed in which the volume fractions of the polyphenylene sulfide and polyphenylene ether used are specified and inorganic filler is used. Further, to decrease the occurrence of flash at the time of injection molding, a resin composition is proposed in which the proportions of polyphenylene sulfide, polyphenylene ether and glass fiber are specified (refer to Patent Document 12). To obtain a resin composition which is composed of polyphenylene sulfide and polyphenylene ether, is low in water absorption properties and anisotropy, and has excellent dimensional stability, it is proposed that a specific linear polyphenylene sulfide is used in combination with a specific crosslinked polyphenylene sulfide (refer to Patent Document 13). Still further, a resin composition suitable for blow molding is proposed in which not only a linear polyphenylene sulfide and a crosslinked polyphenylene sulfide, but a small amount of other resins is used in combination (refer to Patent Document 14).

The present inventors have already proposed resin compositions, as polymer alloy materials composed of a polyphenylene sulfide resin and a polyphenylene ether resin in which a specific compatibilizer is used (refer to, for example, Patent Documents 15 to 16).

[Patent Document 1] JP-A-59-209644
[Patent Document 2] JP-A-60-1241
[Patent Document 3] JP-A-6-322271
[Patent Document 4] JP-A-2000-265060
[Patent Document 5] JP-A-2001-98151
[Patent Document 6] JP-A-2002-129014
[Patent Document 7] JP-A-9-157525
[Patent Document 8] JP-A-11-106655
[Patent Document 9] JP-A-11-158374
[Patent Document 10] JP-A-2002-69298
[Patent Document 11] JP-A-2001-294751
[Patent Document 12] JP-A-2002-179915
[Patent Document 13] JP-A-2002-121383
[Patent Document 14] JP-A-11-228829
[Patent Document 15] JP-A-1-213359
[Patent Document 16] JP-A-2001-302916
[Patent Document 17] JP-A-09-161737
[Patent Document 18] JP-A-10-053706
[Patent Document 19] JP-A-2002-012764

These documents disclose that the disadvantages of resins are overcome, in other words, deterioration of dimensional accuracy with temperature changes is improved and occurrence of flash during molding is inhibited by allowing the resins to take the form of a composition prepared by blending the resin component of polyphenylene sulfide and polyphenylene ether with a variety of inorganic fillers. However, the actual situation is that improvement in heat resistance, and toughness (impact strength) and mechanical strength are still insufficient.

There are also proposed resin compositions whose toughness has been further improved by adding a copolymer of a vinyl aromatic compound and a conjugated diene compound and/or the copolymer having undergone hydrogenation, as an elastomer component, to a resin component (refer to, for example, Patent Documents 17, 18 and 19).

However, for the proposed resin compositions composed of polyphenylene sulfide, polyphenylene ether, and an elastomer component, though their mechanical properties have been improved, none of their impact resistance, stiffness and heat resistance reaches the higher level required to meet the needs for decreasing the thickness of molded articles to keep up with the recent trend toward smaller-sized, lighter-weight and more precise mechanical parts such as frame chassis in the fields of office equipment or information instruments.

DISCLOSURE OF THE INVENTION

Accordingly, an object of the present invention is to provide a resin composition as a polymer alloy composed of a polyphenylene sulfide resin and a polyphenylene ether resin, which provides a molded article that is free from whitening on the surface, exhibits excellent surface appearance and inflammability, and has excellent heat resistance and a balance between toughness (impact strength) and mechanical strength when molded.

After directing tremendous research effort toward overcoming the above described problems and toward the resin composition composed of a polyphenylene sulfide resin and a polyphenylene ether resin, the present inventors found that a resin composition composed of a polyphenylene sulfide resin and a polyphenylene ether resin which, when molded provides a molded article which is free from whitening on the surface, exhibits excellent surface appearance and inflammability, and excels in heat resistance and a balance between toughness (impact strength) and mechanical strength can be obtained by specifying the amount of the oligomers contained and the volatile content in the polyphenylene sulfide resin, and besides, by restricting the structure of the polyphenylene sulfide resin. And they have finally accomplished the present invention.

Specifically, the present invention provides [1] a resin composition that includes: 45 to 99 parts by weight of a polyphenylene sulfide resin composed of 0 to 96% by weight of component (a) as a linear polyphenylene sulfide resin extracted with methylene chloride in an amount of 0.7% by weight or less and having an —SX group, wherein S represents a sulfur atom, and X represents an alkaline metal or a hydrogen atom, in an amount of 20 µmol/g or more, 100 to 4% by weight of a component (b) as a crosslinked polyphenylene sulfide resin having an oligomer extracted with methylene chloride in an amount of 1% by weight or less and having a volatile content collected in a molten state at 320° C. of 1000 ppm or less; 55 to 1 parts by weight of a component (c) as a polyphenylene ether resin; and a component (d) as a styrene copolymer and/or an ethylene copolymer having either a glycidyl group or an oxazolyl group as a functional group, in an amount of 1 to 20 parts by weight per 100 parts by weight of the above described components (a) to (c) in total.

Further, the present invention provides [2] the resin composition according to [1], wherein the above described polyphenylene sulfide resin is composed of 1 to 96% by weight of the above described component (a) and 99 to 4% by weight of the above described component (b).

Further, the present invention provides [3] the resin composition according to [2], including 45 to 85 parts by weight of polyphenylene sulfide resin and 55 to 15 parts by weight of the above described component (c).

Further, the present invention provides [4] the resin composition according to any one of [1] to [3], further including a component (e) as an inorganic filler in an amount of 20 to 400 parts by weight per 100 parts by weight of the above described components (a) to (d) in total.

Further, the present invention provides [5] the resin composition according to any one of [2] to [4], further including a component (f) as an impact-resistance imparting agent in an amount of 5 to 30 parts by weight per 100 parts by weight of the above described components (a) to (d) in total.

Further, the present invention provides [6] the resin composition according to any one of [1] to [5], wherein the above described components (a) and (b) have a melt viscosity of 1 to 10000 poise each.

Further, the present invention provides [7] the resin composition according to any one of [1] to [6], wherein the component (c) is composed of polyphenylene ether in an amount of 100% by weight, or is composed of polyphenylene ether in an amount of 1 to 99% by weight and a styrene resin in an amount of 99 to 1% by weight.

Further, the present invention provides [8] the resin composition according to any one of [1] to [7], wherein the above described component (d) is at least one selected from the group consisting of a styrene-glycidyl methacrylate copolymer, a styrene-glycidyl methacrylate-methyl methacrylate copolymer, a styrene-glycidyl methacrylate-acrylonitrile copolymer, a styrene-vinyloxazoline copolymer, a styrene-vinyloxazoline-acrylonitrile copolymer, an ethylene-glycidyl methacrylate copolymer, an ethylene-acrylic ester-glycidyl methacrylate copolymer, an ethylene-vinyl acetate-glycidyl methacrylate copolymer, a graft copolymer of an ethylene-glycidyl methacrylate copolymer with a styrene monomer grafted thereonto, and a graft copolymer of an ethylene-glycidyl methacrylate copolymer with a styrene monomer and acrylonitrile grafted thereonto.

Further, the present invention provides [9] the resin composition according to any one of [4] to [8], wherein the above described component (e) is at least one selected from the group consisting of a glass fiber, carbon fiber, carbon nanotube, alumina fiber, silicon carbide fiber, ceramic fiber, gypsum fiber, metal fiber, potassium titanate whisker, calcium carbonate, porous calcium carbonate, calcium carbonate whisker, hydrotalcite, kaolin, clay, calcium silicate, carbon black (including conductive carbon), titanium oxide, hydrotalcite, magnesium oxide, aluminum oxide, calcium oxide, fly ash (limestone), wollastonite, glass beads, glass flakes, mica, talc, graphite, aluminum nitride, boron nitride and molybdenum disulfide.

Further, the present invention provides [10] the resin composition according to any one of [5] to [9], wherein the above described component (f) is at least one selected from the group consisting of a block copolymer obtained by copolymerizing a vinyl aromatic compound with a conjugated diene compound, a hydrogenated block copolymer obtained by hydrogenating the above described block copolymer, the above described block copolymer or hydrogenated block copolymer having at least one functional group selected from the group consisting of a hydroxyl group, carboxyl group, acid anhydride group, ester group, epoxy group, oxazolyl group and amino group, an ethylene/α-olefin copolymer, and the above described ethylene/α-olefin copolymer having at least one functional group selected from the group consisting of a hydroxyl group, carboxyl group, acid anhydride group, ester group and amino group.

Further, the present invention provides [11] the resin composition according to any one of [5] to [9], including 5 to 30 parts by weight of the above described component (f), wherein the above described component (f) is composed of: a component (f1) as a hydrogenated block copolymer consisting of at least one polymer block A which contains a vinyl aromatic compound as a main constituent and at least one polymer block B which contains a conjugated diene compound, wherein the bound vinyl aromatic compound is contained in an amount of 55 to 95% by weight; a component (f2) as a hydrogenated block copolymer consisting of a polymer block A which contains a vinyl aromatic compound as a main constituent and at least one polymer block C which contains a conjugated diene compound as a main constituent, wherein the bound vinyl aromatic compound is contained in an amount of 1 to less than 55% by weight; and/or a component (f3) as an olefin elastomer, and the content of the bound vinyl aromatic compound in the above described component (f) is 20 to 55% by weight.

Further, the present invention provides [12] the resin composition according to [11], wherein the above described at least one polymer block B of the above described component (f1) is a random copolymer of a conjugated diene compound and a vinyl aromatic compound.

Further, the present invention is [13] a process for preparing a resin composition according to any one of [1] and [6] to [8], including: melt-kneading the above described components (a) to (d) using a twin-screw extruder which has at least 2 vent holes and at least one side feed opening and whose temperature has been set at 280° C. or higher; and then melt-kneading the components while performing venting through the above described one or more vent holes of the twin-screw extruder at an absolute vacuum pressure of 95 kPa or lower.

Further, the present invention provides [14] the process for preparing a resin composition according to [13], wherein the polyphenylene sulfide resin is composed of 1 to 96% by weight of the above described component (a) and 99 to 4% by weight of the above described component (b), the polyphenylene sulfide resin contains at least 30% by weight of the above described component (a), the weight ratio of the above described component (c) to the above described polyphenylene sulfide resin is 70/30 or less, and, when the above described two vent holes are referred to as a first vent hole and a second vent hole, respectively, the above described venting is performed through the first vent hole, then the remaining polyphenylene sulfide resin is fed and melt-kneaded in the presence of the melt-kneaded material having passed through the first vent hole, and the above described venting is then performed through the second vent hole.

Further, the present invention provides [15] the process for preparing a resin composition according to [13] or [14], wherein the component (e) as an inorganic filler is fed in the presence of the melt-kneaded material consisting of all the above described components (a) to (d) in an amount of 20 to 400 parts by weight per 100 parts by weight of the above described components (a) to (d) in total and melt-kneaded, and then venting is performed through the second vent hole of the twin-screw extruder at an absolute vacuum pressure of 95 kPa or lower.

Further, the present invention provides [16] the process for preparing a resin composition according to [14] or [15], wherein the whole amount of the component (f) as an impact-resistance imparting agent is fed together with the whole amount of the above described component (d).

Further, the present invention provides [17] a resin composition obtained by the preparation process according to any one of [13] to [16].

Further, the present invention provides [18] the resin composition according to any one of [1] to [12] and [17] which is used as a molding material for mechanical components for optical instruments, periphery parts for light source lamps, sheets or films for metal-film laminated substrates, internal parts for hard discs, connector ferrules for optical fibers, printer parts, copier parts, automotive lamp parts, automotive radiator tank parts, or internal parts for automotive engine rooms.

The resin composition of the present invention is a resin composition which includes a polyphenylene sulfide resin and a polyphenylene ether resin and which provides a molded article that is free from whitening on the surface, exhibits excellent surface appearance and inflammability, and have improved heat resistance and an improved balance between toughness (impact strength) and mechanical strength when molded, and hence very useful from the industrial viewpoint.

BEST MODE FOR CARRYING OUT THE INVENTION

In the following the present invention will be described in detail.

The resin composition of the present invention is composed of: a component (a), a linear polyphenylene sulfide resin; a component (b), a crosslinked polyphenylene sulfide resin; a component (c), a polyphenylene ether resin; and a component (d), a styrene copolymer and/or ethylene copolymer having either a glycidyl group or an oxazolyl group.

The linear polyphenylene sulfide resin (hereinafter referred to as linear PPS for short), as the component (a) used in the present invention, is a polymer that typically contains 50% by mole, preferably 70% by mole and more preferably 90% by mole or more of repeating unit, arylene sulfide expressed by the following general formula (1):

(1)

wherein Ar represents an arylene group, and examples of the arylene group include p-phenylene group, m-phenylene group, substituted phenylene group (as a substituent, preferable is an alkyl group with 1 to 10 carbon atoms or a phenyl group), p,p'-diphenylenesulfone group, p,p'-biphenylene group, p,p'-diphenylenecarbonyl group and naphthylene group.

The linear PPS may be a homopolymer which is formed from one type of arylene group unit or, from the view point of workability or heat resistance, it may be a copolymer which is formed from a mixture of two or more different types of arylene group units. A linear polyphenylene sulfide resin having p-phenylene sulfide repeating unit, as a chief constituent, is particularly preferable because of its good workability and heat resistance, and moreover, ease of industrially obtaining.

Processes for preparing such linear PPSs include: for example, processes in which a halogen-substituted aromatic compound, for example, p-dichlorobenzene is polymerized in the presence of sulfur and sodium carbonate; in which a halogen-substituted aromatic compound, for example, p-dichlorobenzene is polymerized in a polar solvent in the presence of sodium sulfide or sodium hydrogensulfide plus sodium hydroxide, or of hydrogen sulfide plus sodium hydroxide or sodium aminoalkanoate; and in which p-chlorothiophenol undergoes self-condensation. Particularly suitable is a process in which sodium sulfide and p-dichlorobenzene are allowed to react in an amid solvent such as N-methylpyrrolidone or dimethylacetamide, or in a sulfone solvent such as sulfolane. These preparation processes are well known, and the linear PPSs can be obtained by the processes described in, for example, U.S. Pat. No. 2,513,188, JP-B-44-27671, JP-B-45-3368, JP-B-52-12240, JP-A-61-225217, U.S. Pat. No. 3,274,165, JP-B-46-27255, Belg. Patent No. 29437 and JA-5-222196, and besides, by the processes of prior art exemplified in the above described patent specifications.

The crosslinked (including semi-crosslinked) polyphenylene sulfide (hereinafter referred to as crosslinked PPS for short), as the component (b), is a polymer which is obtained by preparing the above described linear polyphenylene sulfide resin, as the component (a), by polymerization and heat-treating the polyphenylene sulfide resin at temperatures equal to or lower than the melting point of the same in the presence of oxygen to accelerate the oxidative crosslinking so that the molecular weight and viscosity of the polymer is increased properly.

The linear PPS, as the component (a) used in the present invention, is a linear polyphenylene sulfide resin extracted with methylene chloride in an amount of 0.7% by weight or less and preferably 0.5% by weight or less, and the amount of end-SX group (S represents sulfur and X an alkaline metal or a hydrogen atom) is 20 µmol/g or more and preferably 20 to 60 µmol/g.

The extraction by methylene chloride can be obtained by the following method. Five grams of linear PPS powder is added to 80 ml of methylene chloride, and the methylene chloride solution is subjected to Soxhlet extraction for 6 hours and then cooled to room temperature. The methylene chloride solution after extraction is put into a weighing bottle. The container used in the above extraction is washed three times with methylene chloride totaling 60 ml, and the methylene chloride having been used for the washing is collected into the above weighing bottle. Then the weighing bottle was heated to about 80° C. to vaporize and remove the methylene chloride in the bottle. The residue is weighed, and the amount of the residue weighed is used to obtain the extraction by the methylene chloride, or the percentage of the oligomer existing in the linear PPS.

The amount of —SX group herein mentioned can be determined by the following method. The linear PPS powder is dried in advance at 120° C. for 4 hours, and 20 g of the dried linear PPS powder is added to 150 g of N-methyl-2-pyrrolidone and mixed under vigorous agitation at room temperature for 30 minutes so as to avoid formation of the agglomerates of the powder and make the N-methyl-2-pyrrolidone solution in the form of a slurry. The slurry is then filtered and the filter cake is washed 7 times using 1 liter of warm water at about 80° C. each time. The resultant filter cake is put into 200 g of pure water and made in the form of a slurry, and 1 N hydrochloric acid is added to the slurry so as to adjust the pH of the slurry to 4.5. Then, the slurry is stirred at 25° C. for 30 minutes, filtered, and washed 6 times using 1 liter of warm water at about 80° C. each time. The resultant filter cake is again put into 200 g of pure water and made in the form of a slurry, which is then titrates with 1N sodium hydroxide. The amount of —SX group existing in the linear PPS can be known by the amount of sodium hydroxide consumed.

Concrete examples of processes for preparing the linear PPS that satisfies the requirements: the extraction by methylene chloride is 0.7% by weight or less; and the amount of end-SX group is 20 µmol/g or more, include a process, as described in JP-A-8-253587, in which unnecessary extraction by methylene chloride is decreased by allowing an alkaline metal sulfide and a dihalo aromatic compound to react in an organic amide solvent, cooling the gas phase portion of the reaction can during reaction so as to condense part of the gas phase in the reaction can, refluxing the condensed matter to the liquid phase of the upper portion of the reaction solution so as to decrease the amount of oligomer component, or in which unnecessary extraction by methylene chloride is decreased by increasing the number of washing of the linear PPS after polymerization with an organic amid solvent (e.g. N-methylpyrrolidone).

The crosslinked PPS, as the component (b) used in the present invention, is a crosslinked polyphenylene sulfide in which the oligomer extraction by methylene chloride is 1% by weight or less and the amount of the volatile content collected when the resin is in the molten state at 320° C. is 1000 ppm or less.

The oligomer extraction by methylene chloride can be obtained by the following method. Five grams of PPS powder is added to 80 ml of methylene chloride, and the methylene chloride solution is subjected to Soxhlet extraction for 6 hours and then cooled to room temperature. The methylene chloride solution after extraction is put into a weighing bottle. The container used in the above extraction is washed three times with methylene chloride totaling 60 ml, and the methylene chloride having been used for the washing is collected into the above weighing bottle. Then the weighing bottle was heated to about 80° C. to vaporize and remove the methylene chloride in the bottle. The residue is weighed, and the amount of the residue weighed is used to obtain the extraction by the methylene chloride, or the percentage of the oligomer existing in the PPS.

The volatile content collected when the resin is in the molten state at 320° C. herein mentioned can be determined by the following method. 0.5 g of the crosslinked PPS powder was weighed and put into a test tube with a stopper which has air flow inlet and outlet, nitrogen gas is injected from the inlet of the test tube at a flow rate of 100 cc/min while immersing the test tube in a bath of molten solder heated at 320° C. for 30 minutes, the gas formed in the test tube which contains the volatile content originated from the crosslinked PPS is purged from the air flow outlet of the test tube, the purged gas is introduced into another test tube with a stopper which has air flow inlet and outlet and contains acetone through the inlet and subjected to bubbling in the acetone so that the volatile content is dissolved in the acetone. The volatile content of the crosslinked PPS dissolved in the acetone can be known by the determination with a gas chromatograph-mass spectrometer (GC-MS), assuming that the sensitivity of all the components detected by the temperature programming analysis from 50° C. to 290° C. is the same as that of monochlorobenzene.

In the preparation of the crosslinked polyphenylene sulfide resin extracted with methylene chloride in an amount of 1% by weight or less and the volatile content collected when the resin is in the molten state at 320° C. is 1000 ppm or less, an idea is needed for decreasing unnecessary extract by methylene chloride and volatile content in the polymerization stage for producing a linear PPS as a precursor and in the step of washing. For example, as described in JP-A-8-253587, unnecessary extraction by methylene chloride can be decreased by a process in which the amount of the oligomer component is decreased, when obtaining a linear PPS by allowing an alkaline metal sulfide and a dihalo aromatic compound to react in an organic amide solvent, by cooling the gas phase portion of the reaction can during reaction so as to condense part of the gas phase in the reaction can and refluxing the condensed matter to the liquid phase of the upper portion of the reaction solution, or by a process in which the number of washing of the linear PPS after polymerization with an organic amid solvent (e.g. N-methylpyrrolidone) is increased.

The volatile content can be decreased by increasing not only the number of the above described washing treatment with an organic amide solvent, but also the number of water washing treatment and acid washing treatment, and besides, by controlling the heating temperature and time in the step of heat-treating the linear PPS, so as to make the linear PPS into a crosslinked PPS, in the presence of oxygen and accelerating the oxidative crosslinking. In addition to the above described processes, the crosslinked PPS extracted with methylene chloride in an amount of 1% by weight or more and the volatile content collected when the resin is in the molten state at 320° C. is 1000 ppm or more can be used as the crosslinked polyphenylene sulfide resin as the component (b) of the present invention by positively washing with methylene chloride to decrease unnecessary extract by methylene chloride and the volatile content.

As described above, the crosslinked polyphenylene sulfide resin, as the component (b) used in the present invention, may be prepared by any preparation process, as long as the extract by methylene chloride is 1% by weight or less and the volatile content collected when the resin is in the molten state at 320° C. is 1000 ppm or less.

As described so far, the crosslinked polyphenylene sulfide resin as the component (b) used for preparing a resin composition of the present invention, as long as the extract by methylene chloride is 1% by weight or less and the volatile content collected when the resin composition is in the molten state at 320° C. is 1000 ppm or less, makes it possible to significantly improve the whitening phenomenon, which may occur on the portion of the molded articles corresponding to the welded portion of the die when molding is performed for a long time, to provide excellent appearance to the molded articles, and moreover, to drastically improve the inflammability of the resin composition composed of a polyphenylene sulfide and polyphenylene ether, which has been hard to improve by conventional art.

In the present invention, as the above described linear PPS, component (a), and crosslinked PPS, component (b), those having a melt viscosity at 300° C. of 1 to 10000 poise, preferably 50 to 8000 poise, and more preferably 100 to 5000 poise can be used. The term "melt viscosity" herein used means the value which is measured with JIS K-7210 as a reference test method using a flow tester (by Shimadzu Corporation, flow tester Model CFT-500) at a loading of 196 N and a die length (L)/die diameter (D)=10 mm/1 mm, after preheating each PPS at 300° C. for 6 minutes.

The polyphenylene ether resin, as the component (c) of the present invention, is a polyphenylene ether resin (hereinafter referred to as PPE for short) of homopolymer and/or copolymer which is composed of repeating units expressed by the following bonding unit formula (2) and whose number average molecular weight, in terms of polystyrene, measured by GPC (gel permeation chromatography) is 1000 or more, preferably in the range of 1500 to 50000, and more preferably in the range of 1500 to 30000.

[Formula 1]

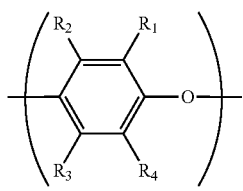

(2)

wherein $R_1$, $R_2$, $R_3$ and $R_4$ are independently selected from the group consisting of hydrogen, halogen, primary or secondary lower alkyl groups with 1 to 7 carbon atoms, phenyl group, haloalkyl groups, aminoalkyl groups, hydrocarbonoxy group, and halohydrocarbonoxy groups in which at least 2 carbon atoms separate halogen atom from oxygen atom.

Concrete examples of such PPEs include: poly(2,6-dimethyl-1,4-phenylene ether), poly(2-methyl-6-ethyl-1,4-phenylene ether), poly(2-methyl-6-phenyl-1,4-phenylene ether) and poly(2,6-dichloro-1,4-phenylene ether). Polyphenylene ether copolymers such as copolymers of 2,6-dimethylphenol and other phenols (e.g. 2,3,6-trimethylphenol and 2-methyl-6-butylphenol) are also included. Of the above described PPEs, poly(2,6-dimethyl-1,4-phenylene ether) and the copolymer of 2,6-dimethylphenol and 2,3,6-trimethylphenol are preferable, and poly(2,6-dimethyl-1,4-phenylene ether) is more preferable.

As a process for preparing such PPEs, any known process can be used. For example, as described in U.S. Pat. No. 3,306,874, a PPE can be easily prepared by subjecting, for example, 2,6-xylenol to oxidative polymerization using the complex of cuprous salt and amine, by Hay, as catalyst. PPEs can also be easily prepared by any of the processes described in U.S. Pat. Nos. 3,306,875, 3,257,357 and 3,257,358, JP-B-52-17880, JP-A-50-51197 and JP-A-63-152628.

Polyphenylene ether resin composed of PPE component=100% by weight can be used as the component (c) of the present invention; however, polyphenylene ether resins composed of PPE/styrene resin=1 to 99% by weight/99 to 1% by weight can be preferably used in the present invention. Of the above polyphenylene ether resins, those composed of PPE/styrene resin=80/20 to 20/80 (% by weight) are most preferably used from the viewpoint of improving the workability of the resin composition of the present invention, which contains the component (e), inorganic filler, described later.

Examples of the above described styrene resins include: homopolymers of styrene compounds; copolymers of 2 types or more of styrene compounds; and rubber modified styrene resins (high impact polystyrene) prepared by dispersing rubber-like polymer in the particle state in the matrix of polymer composed of styrene compounds. Examples of styrene compounds formed into the above described polymers include: styrene, o-methylstyrene, p-methylstyrene, m-methylstyrene, α-methylstyrene, ethylstyrene, α-methyl-p-methylstyrene, 2,4-dimethylstyrene, monochlorostyrene and p-tert-butylstyrene.

The above described styrene compounds may be copolymers prepared using two types or more of styrene compounds together; however, polystyrenes prepared by polymerizing styrene alone are particularly preferable. Of these polymers, polystyrenes having a stereoregular structure, such as atactic polystyrene and syndiotactic polystyrene, can be effectively used. The styrene resins which are used in combination with the above described PPE include: none of styrene copolymers, such as styrene-glycidyl methacrylate copolymer, styrene-glycidyl methacrylate-methyl methacrylate copolymer, styrene-glycidyl methacrylate-acrylonitrile copolymer, styrene-vinyloxazoline copolymer and styrene-vinyloxazoline-acrylonitrile copolymer, which are the component (d) described below; and styrene-butadiene block copolymers and hydrogenated block copolymers as hydrogenated products thereof, exemplified by block copolymers prepared by copolymerizing a vinyl aromatic compound and a conjugated diene compound and hydrogenated block copolymers obtained by hydrogenating the above block copolymers, which correspond to the component (f).

In the resin composition of the present invention, the blend ratio, (a) linear polyphenylene sulfide resin/(b) crosslinked polyphenylene sulfide resin, of the above described polyphenylene sulfide can be selected from 0 to 96% by weight/100 to 4% by weight. The resin composition prepared using a linear polyphenylene sulfide resin in combination with a crosslinked polyphenylene sulfide resin is the most preferable resin composition, in which the blend ratio, (a) linear polyphenylene sulfide resin/(b) crosslinked polyphenylene sulfide resin, is preferably 10 to 90% by weight/90 to 10% by weight and more preferably 15 to 80% by weight/85 to 20% by weight. And the blend ratio of the polyphenylene sulfide, the component (a) and the component (b), to the polyphenylene ether resin, the component (c), is such that (a)+(b)/(c)= 45 to 99 parts by weight/55 to 1 parts by weight, preferably 45 to 85 parts by weight/55 to 15 parts by weight, and more preferably 55 to 85 parts by weight/45 to 15 parts by weight.

In the resin composition prepared by using a linear polyphenylene sulfide resin in combination with a crosslinked polyphenylene sulfide resin, the amount of the linear polyphenylene sulfide resin, the component (a), in the resin composition is required to be 1% by weight or more. And if the amount of the component (a) is 1% by weight or more and 96% by weight or less, the resin composition composed of polyphenylene sulfide resin/polyphenylene ether resin which excels in a balance between toughness (impact strength) and mechanical strength is obtained. The amount of the polyphenylene ether resin, the component (c), in the resin composition is required to be 1 part by weight or more. And if the amount of the component (c) is 1 part by weight or more and 55 parts by weight or less, the resin composition composed of polyphenylene sulfide resin/polyphenylene ether resin which excels in workability, heat resistance, and a balance between toughness (impact strength) and mechanical strength is obtained.

The copolymer used as the component (d) in the present invention is a styrene copolymer and/or an ethylene copolymer each having either a glycidyl group or an oxazolyl group as a functional group. When the copolymer is a styrene copolymer, it acts as an emulsion dispersant when polyphenylene sulfide resins, components (a) and (b), and a polyphenylene ether resin, component (c), are mixed. And it significantly decreases, when the resin composition of the present invention is molded into article, the occurrence of flash on the molded articles, and besides, it effectively provides the molded articles with good heat resistance and a good balance between toughness (impact strength) and mechanical strength. When the copolymer is an ethylene copolymer, it effectively provides the molded articles with good toughness (impact strength).

As such a copolymer as a component (d), a copolymer of an unsaturated monomer having a functional group, either glycidyl group or oxazolyl group, with a monomer mainly composed of styrene or a copolymer of an unsaturated monomer having a functional group, either glycidyl group or oxazolyl group, with a monomer mainly composed of ethylene can be preferably used. When styrene constitutes 100% by weight of the "monomer mainly composed of styrene" herein mentioned, there is no problem. However, when other monomers which are copolymerizable with styrene exist in the "monomer mainly composed of styrene", the amount of styrene monomer contained in the "monomer mainly composed of styrene" is required to be at least 65% by weight or more and preferably 75 to 95% by weight, from the viewpoint of maintaining the compatibility of the copolymer chain of styrene and other monomer copolymerizable with styrene with a polyphenylene ether resin as the component (c). Likewise, when ethylene constitutes 100% by weight of the "monomer mainly composed of ethylene" herein mentioned, there is no problem. However, when other monomers which are copolymerizable with ethylene exist in the "monomer mainly composed of ethylene", the amount of ethylene monomer contained in the "monomer mainly composed of ethylene" is required to be at least 30% by weight or more and preferably 40% by weight or more.

Concrete examples of unsaturated monomers having a functional group, either glycidyl group or oxazolyl group, and constituting the above described copolymers include: glycidyl methacrylate, glycidyl acrylate, vinyl glycidyl ether, glycidyl ether of hydroxyalkyl (meth)acrylate, glycidyl ether of polyalkylene glycol (meth)acrylate and glycidyl itaconate. Of these unsaturated monomers, glycidyl methacrylate is preferable. As the above described oxazolyl group-containing unsaturated monomer, 2-isopropenyl-2-oxazoline is industrially available and preferably used.

Examples of other unsaturated monomers copolymerizable with the above described unsaturated monomers having a functional group, either glycidyl group or oxazolyl group, include: not only styrene and ethylene, as essential components; but also vinyl cyanide monomers such as acrylonitrile, vinyl acetate, acrylic ester and methacrylic ester, as copolymerizing components. The amount of the unsaturated monomers having a functional group, either glycidyl group or oxazolyl group, which are contained in the copolymer as component (d) has to be 0.3 to 20% by weight, preferably 1 to 15% by weight and more preferably 3 to 10% by weight. The amount of the unsaturated monomers having a functional group, either glycidyl group or oxazolyl group, which are contained in the copolymer as component (d) has to be 0.3% by weight or more, and if the amount is 20% by weight or less, the compatibility of the polyphenylene sulfide resin composed of the components (a) and (b) with the polyphenylene ether resin as the component (c) becomes good. This makes it possible, when the resin composition prepared using such components is molded in parts, to significantly inhibit flash from occurring on the molded articles, and besides, to effectively provide the molded articles with good heat resistance and a good balance between toughness (impact strength) and mechanical strength.

Examples of copolymers, as component (d), obtained by copolymerizing the above described copolymerizable unsaturated monomers include: styrene-glycidyl methacrylate copolymer, styrene-glycidyl methacrylate-methyl methacrylate copolymer, styrene-glycidyl methacrylate-acrylonitrile copolymer, styrene-vinyloxazoline copolymer, styrene-vinyloxazoline-acrylonitrile copolymer, ethylene glycidyl methacrylate copolymer, ethylene-acrylic ester-glycidyl methacrylate copolymer, and ethylene-vinyl acetate-glycidyl methacrylate copolymer. The copolymers, as component (d), may be copolymers prepared by grafting a styrene monomer onto an ethylene copolymer. Examples of such copolymers include: graft copolymers of ethylene-glycidyl methacrylate copolymer with styrene monomer grafted thereonto, and graft copolymers of ethylene-glycidyl methacrylate copolymer with styrene monomer and acrylonitrile grafted thereonto.

The amount of the copolymers, as component (d), blended is required to be 1 to 20 parts by weight, preferably 2 to 15 parts by weight and more preferably 3 to 10 parts by weight per 100 parts by weight of the total amount of the components (a) to (c). If the amount of component (d) blended is 1 part by weight or more, the compatibility of the polyphenylene sulfide resin, components (a) and (b), with the polyphenylene ether resin, component (c), becomes good, whereas if the amount is 20 parts by weight or less, the resin composition prepared using the components when molded can provide molded articles with production of flash significantly suppressed and with good heat resistance (impact strength) and a good balance between toughness and mechanical strength.

The resin composition of the present invention is characterized by being composed of the above described components (a) to (d). However, it may be a resin composition further containing the following inorganic filler, as component (e), and/or the following impact-resistance imparting agent, as component (f).

The inorganic filler, used as component (e) of the present invention, can be added to the resin composition of the present invention so as to provide the resin composition with the functions of reinforcing the mechanical strength and improving the dimensional accuracy of the parts molded from the resin composition. Examples of such inorganic fillers include: a glass fiber, carbon fiber, carbon nanotube, alumina fiber, silicon carbide fiber, ceramic fiber, gypsum fiber, metal fiber, potassium titanate whisker, calcium carbonate, porous calcium carbonate, calcium carbonate whisker, hydrotalcite, kaolin, clay, calcium silicate, carbon black (including conductive carbon), titanium oxide, hydrotalcite, magnesium oxide, aluminum oxide, calcium oxide, fly ash (limestone), wollastonite, glass beads, glass flakes, mica, talc, graphite, aluminum nitride, boron nitride and molybdenum disulfide. At least one type of inorganic filler can be selected form the above described inorganic fillers, according to the purpose for which it is used. Before used, these inorganic fillers may be treated with surface treatment agent, such as silane coupling agent, titanate coupling agent or aliphatic metal salt, or treated with ammonium salt etc. by intercalation process to be organic fillers, or treated with a resin, such as urethane resin or epoxy resin, as a binder.

The amount of the inorganic filler, component (e), blended is 20 to 400 parts by weight, preferably 50 to 250 parts by weight and more preferably 60 to 200 parts by weight per 100 parts by weight of the total amount of the above described components (a) to (d). If the amount is 20 parts by weight or more, the mechanical strength of the resultant resin composition is improved, and besides, when the resin composition is molded into article, the dimensional accuracy of the molded articles is also improved. And if the amount is 400 parts by weight or less, when the resin composition is molded into article, the molded articles is less susceptible to sink marks and can maintain their excellent dimensional accuracy and anisotropy even under temperature changes (−30° C. to 100° C.)

The impact-resistance imparting agent, used as component (f) of the present invention, can be added to the resin composition of the present invention so as to impart impact resistance to the resin composition. Examples of such impact-resistance imparting agents include: block copolymers obtained by copolymerizing a vinyl aromatic compound and a conjugated diene compound, hydrogenated block copolymers obtained by hydrogenating the above described block copolymers, the above described block copolymers or hydrogenated block copolymers having at least one functional group selected from the group consisting of hydroxyl, carboxyl, acid anhydride, ester, epoxy, oxazolyl and amino groups. Further, ethylene/α-olefin copolymers, copolymers obtained by grafting an unsaturated compound having at least one functional group selected from the group consisting of hydroxyl, carboxyl, acid anhydride, ester, epoxy, oxazolyl and amino groups onto the above described ethylene/α-olefin copolymers in the presence or absence of radical initiator, and functional group-containing copolymers obtained by copolymerizing ethylene and/or α-olefin other than ethylene with a functional group-containing unsaturated compound having at least one functional group selected from the group consisting of hydroxyl, carboxyl, acid anhydride, ester, epoxy, oxazolyl and amino groups are also included. At least one impact-resistance imparting agent can be selected from the above described agents according to the purpose for which it is used and used as component (f) of the present invention.

As component (f), preferably used is an impact-resistance imparting agent made up of: a hydrogenated copolymer (f1) which is made up of at least one polymer block A composed mainly of a vinyl aromatic compound and at least one polymer block B including a conjugated diene compound and in which the amount of bound vinyl aromatic compound is 55 to 95% by weight; a hydrogenated black copolymer (f2) which is made up of a polymer block A composed mainly of a vinyl aromatic compound and at least one polymer block C composed mainly of a conjugated diene compound and in which the amount of bound vinyl aromatic compound is 1 to less than 55% by weight; and/or olefin elastomer (f3), the amount of the bound vinyl aromatic compound contained in the impact-resistance imparting agent made up of (f1) to (f3) being 20 to 55% by weight. The impact-resistance imparting agent in which at least one polymer block B of the component (f1) is a random copolymer of a conjugated diene compound with a vinyl aromatic compound can also be suitably used.

The hydrogenated copolymer (f1), as a constituent of component (f) of the present invention, which is made up of at least one polymer block A composed mainly of a vinyl aromatic compound and at least one polymer block B including a conjugated diene compound and contains 55 to 95% by weight of bound vinyl aromatic compound is a hydrogenated block copolymer obtained by hydrogenating a vinyl aromatic compound—conjugated diene compound block copolymer which has a structure such as A-B, A-B-A, B-A-B-A, (A-B—)$_4$—Si or A-B-A-B-A and contains 55 to 95% by weight and preferably 60 to 90% by weight of bound vinyl aromatic compound.

Referring to block structure, the structure of the "polymer block A composed mainly of a vinyl aromatic compound" is that of homopolymer block of a vinyl aromatic compound or that of copolymer block of a vinyl aromatic compound with a conjugated diene compound which contains 90% by weight or more of vinyl aromatic compound. The structure of the "polymer block B including a conjugated diene compound" is that of homopolymer block of a conjugated diene compound or that of copolymer block of a conjugated diene compound which contains more than 10% by weight and less than 90% by weight of conjugated diene compound with a vinyl aromatic compound. In the polymer block A composed mainly of a vinyl aromatic compound and the polymer block B including a conjugated diene compound, the distribution of the conjugated diene compound or vinyl aromatic compound in the molecular chain of each polymer block may be random, tapered (the amount of the monomer component is increased or decreased along the molecular chain), partly block-like or any combination thereof. And when the block copolymer contains two or more polymer blocks, which are composed mainly of a vinyl aromatic compound, and two or more polymer blocks, which include a conjugated diene compound, the respective two or more blocks may have the same structure or different structures.

As the vinyl aromatic compounds that constitute the block copolymer, one or two or more can be selected from the group consisting of styrene, α-methylstyrene, vinyltoluene, p-tert-butylstyrene and diphenylethylene. Of these compounds, styrene is preferable. As the conjugated diene compounds, one or two or more can be selected from the group consisting of butadiene, isoprene, 1,3-pentadiene and 2,3-dimethyl-1,3-butadiene. Of these compounds, butadiene, isoprene and the combination thereof are preferable. In the polymer block including a conjugated diene compound, the micro-structure of the binding form in the block can be arbitrarily selected. For example, in the polymer block composed mainly of butadiene, it preferably contains 2 to 90% of 1,2-vinyl bond and more preferably 8 to 80% of the same. In the polymer block composed mainly of isoprene, it preferably contains 2 to 80% of 1,2-vinyl bond and 3,4-vinyl bond in total and more preferably 3 to 70% of the same.

The number average molecular weight of the hydrogenated block copolymer, used as component (f1) of the present invention, is preferably in the range of 5,000 to 1,000,000, particularly preferably in the range of 20,000 to 500,000. The molecular weight distribution (the ratio of weight average molecular weight (Mw) to number average molecular weight (Mn) measured by gel permeation chromatography and obtained in terms of polystyrene) is preferably 10 or less.

The molecular structure of the hydrogenated block copolymer may be any one of straight-chain, branched-chain and radial structures, or any combination thereof. The block copolymer having such a structure can be obtained by hydrogenating the aliphatic double bond of the polymer block B, which includes a conjugated diene compound of the above mentioned block copolymer, and can be used as the hydrogenated block copolymer, as component (f1), of the present invention. Preferably, the rate of hydrogenation of the aliphatic double bond is at least more than 20%, more preferably 50% or more and particularly preferably 80% or more.

The rate of hydrogenation can be known using, for example, a nuclear magnetic resonance spectrometer (NMR).

The hydrogenated copolymer (f2) which is made up of a polymer block A composed mainly of a vinyl aromatic compound and at least one polymer block C composed mainly of a conjugated diene compound and in which the amount of bound vinyl aromatic compound is 1 to less than 55% by weight is a hydrogenated block copolymer obtained by hydrogenating a vinyl aromatic compound—conjugated diene compound block copolymer which has a structure such as A-C, A-C-A, C-A-C-A, (A-C—)$_4$—Si or A-C-A-C-A and contains 1 to less than 55% by weight and preferably 1 to 50% by weight of bound vinyl aromatic compound. Referring to block structure, the structure of the "polymer block A composed mainly of a vinyl aromatic compound" is that of homopolymer block of a vinyl aromatic compound or that of copolymer block of a vinyl aromatic compound with a conjugated diene compound which contains 90% by weight or more of vinyl aromatic compound. The structure of the "polymer block B composed mainly of a conjugated diene compound" is that of homopolymer block of a conjugated diene compound or that of copolymer block of a conjugated diene compound which contains more than 90% by weight of conjugated diene compound with a vinyl aromatic compound.

In the polymer block A composed mainly of a vinyl aromatic compound and the polymer block C composed mainly of a conjugated diene compound, the distribution of the conjugated diene compound or vinyl aromatic compound in the molecular chain of each polymer block may be random, tapered (the amount of the monomer component is increased or decreased along the molecular chain), partly block-like or any combination thereof. And when the block copolymer contains two or more polymer blocks, which are composed mainly of a vinyl aromatic compound, and two or more polymer blocks, which are composed mainly of a conjugated diene compound, the respective two or more blocks may have the same structure or different structures.

As the vinyl aromatic compounds that constitute the block copolymer, one or two or more can be selected from the group consisting of styrene, α-methylstyrene, vinyltoluene, p-tert-butylstyrene and diphenylethylene. Of these compounds, styrene is preferable. As the conjugated diene compounds, one or two or more can be selected from the group consisting of butadiene, isoprene, 1,3-pentadiene and 2,3-dimethyl-1,3-butadiene. Of these compounds, butadiene, isoprene and the combination thereof are preferable. In the polymer block composed mainly of a conjugated diene compound, the micro-structure of the binding form in the block can be arbitrarily selected. For example, in the polymer block composed mainly of butadiene, it preferably contains 2 to 90% of 1,2-vinyl bond and more preferably 8 to 80% of the same. In the polymer block composed mainly of isoprene, it preferably contains 2 to 80% of 1,2-vinyl bond and 3,4-vinyl bond in total and more preferably 3 to 70% of the same. The number average molecular weight of the hydrogenated block copolymer, used as component (f2) of the present invention, is preferably in the range of 5,000 to 1,000,000 and particularly preferably in the range of 20,000 to 500,000. The molecular weight distribution (the ratio of weight average molecular weight (Mw) to number average molecular weight (Mn) measured by gel permeation chromatography and obtained in terms of polystyrene) is preferably 10 or less.

The molecular structure of the hydrogenated block copolymer may be any one of straight-chain, branched-chain and radial structures, or any combination thereof. The block copolymer having such a structure can be obtained by hydrogenating the aliphatic double bond of the polymer block C, which is composed mainly of a conjugated diene compound, and can be used as the hydrogenated block copolymer, as component (f2), of the present invention. Preferably, the rate of hydrogenation of the aliphatic double bond is at least more than 20%, more preferably 50% or more and particularly preferably 80% or more. The rate of hydrogenation can be known using, for example, a nuclear magnetic resonance spectrometer (NMR). The component (f3), olefin elastomer, when used in combination with the above described component (f1) and/or (f2), is very effective in imparting impact resistance to the resin composition of the present invention. Concrete examples of such olefin elastomers include: ethylene.α-olefin copolymers; and hydrogenated conjugated diene compounds obtained by hydrogenating polymers of conjugated diene compounds. Ethylene.α-olefin copolymers are homopolymers or copolymers of olefins: straight-chain olefins such as ethylene, propylene, butene-1, pentene-1, hexene-1, heptene-1 and octene-1; and branched-chain olefins such as 2-methylpropene-1,3-methylpentene-1,4-methylpentene-1,5-methylhexene-1,4-methylhexene-1 and 4,4-dimethylpentene-1.

Of the above described ethylene.α-olefin copolymers, copolymers or homopolymers that contain more than 50% by weight of ethylene, propylene, butene-1, octene-1 or 4-methylpentene-1 are preferable, and homopolymers of ethylene, block or random copolymers of ethylene-propylene or block or random copolymers of ethylene-octene are more preferable. The melt flow rate (MFR) of the ethylene.α-olefin copolymers, which is measured at 230° C. and a loading of 21.2 N, is typically 0.01 to 400 g/10 minutes, preferably 0.15 to 60 g/10 minutes and more preferably 0.3 to 40 g/10 minutes.

The above described ethylene.α-olefin copolymers can be prepared by conventionally known processes and commercial ones are also available. An ethylene.α-olefin copolymer can be selected from those described above and used in the present invention.

The amount of the impact-resistance imparting agent, component (f), blended is 5 to 30 parts by weight, preferably 5 to 20 parts by weight and more preferably 10 to 20 parts by weight per 100 parts by weight of the total amount of the resin composition composed of the above described components (a) to (d). If the amount is 5 parts by weight or more, the resin composition prepared by using the impact-resistance imparting agent, when molded provides the molded articles with good heat resistance and improved toughness such as impact strength. If the amount is 30 parts by weight or less, the molded articles produced from the resin composition prepared using the component can have good heat resistance and a good balance between toughness (impact strength) and mechanical strength.

For the resin composition of the present invention which does not contain the linear polyphenylene sulfide resin, component (a), but is prepared using the crosslinked polyphenylene sulfide resin, component (b), in order for the resin composition to produce the effect of the present invention, it is most preferable to prepare the composition through a specified process described below.

Specifically, the most preferable process for preparing the resin composition of the present invention is a process for preparing a resin composition that contains: 45 to 99 parts by weight of polyphenylene sulfide resin that contains no linear polyphenylene sulfide resin, component (a), at all, but is composed of 100% by weight of crosslinked polyphenylene sulfide resin in which the oligomer extraction by methylene chloride is 1% by weight or less and the volatile content collected when the resin is in the molten state at 320° C. is 1000 ppm or less, component (b); 55 to 1 parts by weight of polyphenylene ether resin, component (c); and a styrene copolymer and/or an ethylene copolymer each containing one functional group, either glycidyl group or oxazolyl group, component (d) in an amount of 1 to 20 parts by weight per 100 parts by weight of the total amount of the components (a) to (c), the process including (1) melt-kneading the components (b) to (d) using a twin-screw extruder which has at least 2 vent holes and at least one side feed opening and whose temperature has been set at 280° C. to 350° C.; and then continuing melt-kneading while performing venting through one or more of the vent holes of the twin-screw extruder at an absolute vacuum pressure of 95 kPa or lower.

In the process for preparing the resin composition of the present invention that contains an inorganic filler, as component (e), the inorganic filler, component (e), is added and melt-kneaded under heat in the presence of the resin composition composed of all the components (b) to (d) which have been melt-kneaded using the twin-screw extruder while performing venting through the first vent hole of the twin-screw extruder at an absolute vacuum pressure of 95 kPa or lower in the step (1) of the above described process, and further melt-kneaded while performing venting through the second vent hole of the twin-screw extruder at an absolute vacuum pressure of 95 kPa or lower.

In the process for preparing the resin composition of the present invention that further contains the component (f), the impact-resistance imparting agent, component (f), is added together with the components (b) to (d) when obtaining the melt-kneaded product in the step (1) of the above described preparation process.

For the resin composition of the present invention which is prepared by using the linear polyphenylene sulfide resin, component (a), in combination with the crosslinked polyphenylene sulfide resin, component (b), in order for the resin composition to produce the effect of the present invention, it is most preferable to prepare the composition through a specified process described below.

Specifically, the most preferable process for preparing the resin composition of the present invention is a process for preparing a resin composition that contains: 45 to 99 parts by weight of polyphenylene sulfide resin composed of 1 to 96% by weight of linear polyphenylene sulfide resin, component (a), and 99 to 4% by weight of crosslinked polyphenylene sulfide resin, component (b); 55 to 1 parts by weight of polyphenylene ether resin, component (c); and a compatibility-imparting agent, component (d), in an amount of 1 to 20 parts by weight per 100 parts by weight of the total amount of the components. (a) to (c), the process including (1) melt-kneading, under heat, the components (a) to (c) in such an amount that the polyphenylene ether resin, or component (c)/the polyphenylene sulfide resin=70 or less/30 (weight ratio) and the amount of the linear polyphenylene sulfide resin, component (a), contained in the above polyphenylene sulfide resin is at least 30% by weight, preferably 40% by weight or more and more preferably 50% by weight or more and the whole amount of copolymer, component (d), in the first step of melt-kneading under heat using a twin-screw extruder which has at least 2 vent holes and at least one side feed opening and whose temperature has been set at 280° C. to 350° C. and performing venting through the first vent hole of the twin-screw extruder at an absolute vacuum pressure of 95 kPa or lower to obtain a first melt-kneaded product; and then (2) adding the remaining amount of polyphenylene sulfide resin from the first side feed opening of the twin-screw extruder in the presence of the first melt-kneaded product obtained in the step (1), further melt-kneading the added resin and the melt-kneaded product under heat, and performing venting through the second vent hole of the twin-screw extruder at an absolute vacuum pressure of 95 kPa or lower.

In the process for preparing the resin composition of the present invention that further contains the component (e), the inorganic filler, component (e), is added from the second side feed opening of the twin-screw extruder in the presence of the resin composition which has been prepared by adding the remaining amount of the polyphenylene sulfide resin from the first side feed opening of the twin-screw extruder and melt kneading the resin composition and the resin in the step (2) of the above described process and is composed of all the components (a) to (d), and venting is performed through the second vent hole of the twin-screw extruder at an absolute vacuum pressure of 95 kPa or lower.

In the process for preparing the resin composition of the present invention that further contains the component (f), the impact-resistance imparting agent, component (f), is added together with the components (a) to (d) when obtaining the melt-kneaded product in the step (1) of the above described preparation process.

In the present invention, in addition to the above described components, any one of heat stabilizer, antioxidant, stabilizer such as ultraviolet light absorber, nucleating agent, antistatic agent, flame-retardant, colorant such as pigment or dye, polyethylene wax, polypropylene wax, known mold release agent such as montan wax or stearate wax can be properly added, if necessary.

For the resin composition of the present invention thus obtained, which can be molded into delicate parts, molding methods such as injection molding, metal in-mold molding, outsert molding, extrusion molding, sheet molding, film molding, heat press molding, rotational molding and laminated molding can be adopted.

In accordance with the above described molding processes, the resin composition of the present invention can be widely used as molded articles such as mechanical components for optical instruments, periphery parts for light source lamps, sheets or films for metal-film laminated substrates, internal parts for hard discs, connector ferrules for optical fibers, printer parts; copier parts; internal parts for automotive engine rooms such as automotive radiator tank parts; and automotive lamp parts.

In the following the present invention will be described by examples.

EXAMPLES

The raw materials used were as follows.
Linear Polyphenylene Sulfide Resins as a Component (a)
The following linear polyphenylene sulfide resins were obtained in accordance with the process of example 1 disclosed in JP-A-8-253587.

(a-1): A linear PPS resin which has repeating units of p-phenylene sulfide, which has a melt viscosity of 500 poise (the value measured with a flow tester after the resin is kept at 300° C., a loading of 196 N and L/D=10/1 for 6 minutes), extracted with methylene chloride in an amount of 0.4% by weight, and in which the amount of —SX group is 26 µmol/g.

(a-2): A linear PPS resin which has repeating units of p-phenylene sulfide, which has a melt viscosity of 300 poise (the value measured in the same manner as in a-1), extracted with methylene chloride in an amount of 0.7% by weight, and in which the amount of —SX group is 32 µmol/g.

(a-3): A linear PPS resin which has repeating units of p-phenylene sulfide, which has a melt viscosity of 100 poise (the value measured in the same manner as in a-1), extracted with methylene chloride in an amount of 0.3% by weight, and in which the amount of —SX group is 35 µmol/g.

Crosslinked Polyphenylene Sulfide Resins as a Component (b)

(b-1): A crosslinked PPS resin which has a melt viscosity of 500 poise (the value measured with a flow tester after the resin is kept at 300° C., a loading of 196 N and L/D=10/1 for 6 minutes), in which the oligomer extraction by methylene chloride is 0.7% by weight, and in which the volatile content collected when it is in the molten state at 320° C. is 160 ppm (by DIC EP Inc., DSP™ K-2G).

(b-2): A crosslinked PPS resin which has a melt viscosity of 500 poise (the value measured in the same manner as in b-1), in which the oligomer extraction by methylene chloride is 0.4% by weight, and in which the volatile content collected when it is in the molten state at 320° C. is 300 ppm (by DIC EP Inc., DSP™ T-2G).

(b-3): A trial product of crosslinked PPS resin which has a melt viscosity of 500 poise (the value measured in the same manner as in b-1), in which the oligomer extraction by methylene chloride is 0.8% by weight, and in which the volatile content collected when it is in the molten state at 320° C. is 790 ppm.

(b-4): A crosslinked PPS resin which has a melt viscosity of 500 poise, in which the oligomer extraction by methylene chloride is 1.2% by weight, and in which the volatile content collected when it is in the molten state at 320° C. is 1200 ppm (by Toray Industries Inc., Torelina™ M2900).

(b-5): A crosslinked PPS resin which has a melt viscosity of 500 poise, in which the oligomer extraction by methylene chloride is 2.1% by weight, and in which the volatile content collected when it is in the molten state at 320° C. is 1800 ppm (by Chevron Philips Chemical, Ryton™ PR-07)

Polyphenylene Ether Resins as a Component (c)

(c-1): A polyphenylene ether resin which is obtained by subjecting 2,6-xylenol to oxidative polymerization and whose number average molecular weight, measured by GPC (gel permeation chromatography) and expressed in terms of polystyrene, is 24000.

(c-2): A polyphenylene ether resin which is obtained by subjecting 2,6-xylenol to oxidative polymerization and whose number average molecular weight, measured by GPC (gel permeation chromatography) and expressed in terms of polystyrene, is 9600.

(c-3): A polyphenylene ether resin which is obtained by dry-blending (simply blending without melting under heat) a polyphenylene ether resin (c-1), as a polyphenylene ether resin, and atactic polystyrene (by PS Japan, PSJ-polystyrene™ 685) in the ratio of 60 to 40 (weight ratio).

Copolymers as a Component (d)

(d-1): A styrene—glycidyl methacrylate copolymer which contains 5% by weight of glycidyl methacrylate (weight average molecular weight 110,000).

(d-2): A styrene—2-isopropenyl-2-oxazoline copolymer which contains 5% by weight of 2-isopropenyl-2-oxazoline (weight average molecular weight 146,000).

(d-3): An ethylene—glycidyl methacrylate copolymer which contains 6% by weight of glycidyl methacrylate (Sumitomo Chemical Co., Ltd., BOND FAST™ 2C).

Inorganic Fillers as a Component (e)

(e-1): Glass fiber 13 μm in average diameter and 3 mm in length which has been surface treated with amino silane coupling agent and further treated with an epoxy resin as a binder.

(e-2): Glass flakes 600 μm in average flake diameter which has been surface treated with amino silane coupling agent and further treated with an epoxy resin as a binder.

(e-3): Mica 90 μm in average flake diameter and 2 μm in average flake thickness which has been surface treated with amino silane coupling agent.

(e-4) Fly ash categorized as fly ash II under JIS A6201-1999 (Techno Chubu Company Ltd., Chubu Fly Ash).

(e-5) Calcium carbonate obtained by adding 1.5 parts by weight of silane coupling agent (β-(3,4-epoxycyclohexyl) ethyl-trimethoxysilane) to 100 parts by weight of calcium carbonate with an average particle diameter of 7 μm and then blending the same with a blender.

(e-6) Talc with an average particle diameter of 11 μm, measured by laser diffraction/scattering method.

Impact-Resistance Imparting Agents as a Component (f)

(f-1): A hydrogenated block copolymer having a polystyrene block—hydrogenated polybutadiene—polystyrene block structure in which the amount of the bound styrene is 47%, the amount of the 1,2-vinyl binding in the polybutadiene moiety is 48%, the number average molecular weight of the polystyrene chain is 19000 and the rate of hydrogenation in the polybutadiene moiety is 99.8%.

(f-2): A hydrogenated block copolymer having a polystyrene block—hydrogenated polybutadiene—polystyrene block structure in which the amount of the bound styrene is 35%, the amount of the 1,2-vinyl binding in the polybutadiene moiety is 55%, the number average molecular weight of the polystyrene chain is 43000 and the rate of hydrogenation in the polybutadiene moiety is 99.2%.

(f-3): A hydrogenated block copolymer having a polystyrene block—hydrogenated polybutadiene —polystyrene block structure in which the amount of the bound styrene is 85%, the amount of the 1,2-vinyl binding in the polybutadiene moiety is 40%, the number average molecular weight of the polystyrene chain is 44000 and the rate of hydrogenation in the polybutadiene moiety is 98%.

(f-4): A hydrogenated block copolymer having a polystyrene block—hydrogenated polybutadiene —polystyrene block structure in which the amount of the bound styrene is 20%, the amount of the 1,2-vinyl binding in the polybutadiene moiety is 55%, the number average molecular weight of the polystyrene chain is 9800 and the rate of hydrogenation in the polybutadiene moiety is 98%.

(f-5): A hydrogenated block copolymer having a polystyrene block—hydrogenated polybutadiene —polystyrene block structure in which the amount of the bound styrene is 20%, the amount of the 1,2-vinyl binding in the polybutadiene moiety is 55%, the number average molecular weight of the polystyrene chain is 10,000 and the rate of hydrogenation in the polybutadiene moiety is 62%.

(f-6): A hydrogenated block copolymer having a polystyrene block—hydrogenated polybutadiene —polystyrene block structure in which the amount of the bound styrene is 84%, the polybutadiene moiety is a random copolymer of hydrogenated polybutadiene/polystyrene=43%/57%, the amount of the 1,2-vinyl binding in the polybutadiene moiety is 38%, the number average molecular weight of the polystyrene chain is 30,000 and the rate of hydrogenation in the polybutadiene moiety is 96%.

(f-7): An ethylene—propylene copolymer whose melt flow rate, measured at a density of 0.87, 230° C. and a loading of 21.2 N, is 0.7 g/10 minutes.

(f-8): An ethylene—octene copolymer whose melt flow rate, measured at a density of 0.86, 230° C. and a loading of 21.2 N, is 0.5 g/10 minutes.

Other Additives as a Component (g)

(g): Calcium montanate (by Clariant Japan, Licomont™ CaV102) was used as a component (g), a mold release agent.

As a colorant common to all examples, carbon black (by Mitsubishi Chemical Corporation, Mitsubishi Carbon Black™ MCF88) was used.

The molded articles produced using the resin compositions obtained from the above described components were evaluated as follows.

(Whitening on Molding Test)

Each of the resin compositions was fed into a screw in-line type injection molding machine whose temperature had been set at 310° C., and continuous molding was performed using a welded metal die with no vent zone provided (a plate-like metal die 38 mm long, 79 mm wide and 5 mm thick which had a welded portion in the middle of its width and gate portions both sides of the welded portion 8 mm apart therefrom) at 130° C. And the number of shots performed until the portion of the resultant part corresponding to the welded portion of the die was whitened was obtained. The material for which a larger number of shots were performed was less likely to cause whitening on the molded article.

(Inflammability Test)

Test pieces 1.6 mm thick were molded, and flammability test was conducted in accordance with UL 94.

(Deflection Temperature Under Load)

Each of the resin compositions was fed into a screw in-line type injection molding machine whose temperature had been set at 290 to 310° C., and test pieces were molded at a die temperature of 130° C. The DTUL (Deflection Temperature Under Load) was measured for each test piece in accordance with ASTM D-648 (under a load of 1.82 MPa).

(Impact Strength)

Each of the resin compositions was fed into a screw in-line type injection molding machine whose temperature had been set at 290 to 310° C., and test pieces were molded at a die temperature of 130° C. The izod impact strength (notched izod ⅛ in thick) was measured for each test piece in accordance with ASTM D-256 (at a measuring temperature of 23° C.).

(Tensile Strength)

Each of the resin compositions was fed into a screw in-line type injection molding machine whose temperature had been set at 290 to 310° C., and test pieces were molded at a die temperature of 130° C. The tensile strength was measured for each test piece in accordance with ASTM D-638 (at a measuring temperature of 23° C.)

Examples 1 to 31, Comparative Examples 1 to 14

Resin compositions in the form of pellets were obtained using a twin-screw extruder (ZSK-40; by COPERION WERNER & PFLEIDERER, Germany) in which the temperature had been set to 290 to 310° C. and the screw rotational speed had been set to 280 rpm in such a manner as to: feed the respective components in accordance with the composition listed in Table 1 to Table 4 from the first raw-material feed opening of the extruder and melt-knead the components under heat; vary the vacuum degree of the first vent hole after the melt-kneading to perform venting; further feed the respective components listed in Table 1 to Table 4 from the first and second side feed openings located downstream of the first vent hole of the twin-screw extruder and melt-knead the same; and then vary the vacuum degree of the second vent hole located short of the outlet of the twin-screw extruder to perform venting. The pellets thus obtained were fed into a screw in-line type injection molding machine whose temperature had been set at 290 to 310° C., and continuous molding was performed in a welded metal die at a die temperature of 130° C. The number of injection shots made until the portion of the resultant part corresponding to the welded portion of the die was whitened was obtained. For the materials which did not cause whitening on molding, 5000 injection shots were made.

As samples used for other tests, test pieces for deflection temperature under load (DTUL) test, izod impact strength test, tensile strength test and inflammability test were injection molded at a die temperature of 130° C.

Then, the deflection temperature under load: DTUL (ASTM D-648: under a load of 1.82 MPa), izod (notched izod ⅛ in thick) impact strength (in accordance with ASTM D-256: at a measuring temperature of 23° C.), and tensile strength (in accordance with ASTM D-638: at a measuring temperature of 23° C.) were measured. Test pieces 1.6 mm thick were burned in accordance with UL 94, and the burning level was measured for each test piece.

These results were all shown in Table 1 to Table 5.

The results confirms that the use of a crosslinked polyphenylene sulfide resin in which the amount and the volatile component are decreased to specific amounts makes possible a resin composition composed of a polyphenylene sulfide resin and polyphenylene ether resin which provides a molded article that is free from whitening on the surface of the parts and exhibits excellent surface appearance and inflammability when molded, and moreover, the resin composition prepared using a linear polyphenylene sulfide resin in combination with a crosslinked polyphenylene sulfide resin is a novel resin composition which is superior to rein compositions in which a linear polyphenylene sulfide resin and a crosslinked polyphenylene sulfide resin are not used together in heat resistance and a balance between toughness (impact strength) and mechanical strength.

TABLE 1

| | | | Example 1 | Example 2 | Example 3 | Example 4 | Example 5 |
|---|---|---|---|---|---|---|---|
| Component (b) | Component (b-1) | parts by weight | 36 | | | 40 | 36 |
| | Component (b-2) | parts by weight | | 36 | | | |
| | Component (b-3) | parts by weight | | | 36 | | |
| | Component (b-4) | parts by weight | | | | | |
| | Component (b-5) | parts by weight | | | | | |
| Component (c) | Component (c-1) | parts by weight | 24 | 24 | 24 | | 24 |
| | Component (c-2) | parts by weight | | | | 25 | |
| | Component (c-3) | parts by weight | | | | | |
| Component (d) | Component (d-1) | parts by weight | 1.5 | 2.0 | 3.0 | | 1.5 |
| | Component (d-2) | parts by weight | | | | 2.0 | |
| | Component (d-3) | parts by weight | | | | 8.0 | |
| Component (e) | Component (e-1) | parts by weight | 20 | 20 | 20 | 15 | 20 |
| | Component (e-2) | parts by weight | | | | | |
| | Component (e-3) | parts by weight | 20 | 20 | 20 | | 20 |
| | Component (e-4) | parts by weight | | | | 20 | |
| | Component (e-5) | parts by weight | | | | | |
| Colorant (carbon black) | | parts by weight | 0.8 | 0.8 | 0.8 | 0.8 | 0.8 |
| Vacuum degree of first vent hole | | kPa | blockade[1] | blockade | blockade | blockade | 15 |
| Component fed from first side feed opening | | | e-3 | e-3 | e-3 | e-4 | e-3 |
| Component fed from second side feed opening | | | e-1 | e-1 | e-1 | e-1 | e-1 |

TABLE 1-continued

|  |  |  |  |  |  |  |
|---|---|---|---|---|---|---|
| Vacuum degree of second vent hole | kPa | blockade | blockade | blockade | blockade | 15 |
| Number of shots made on and after which whitening on molding occurs |  | 1166 | 2326 | 1082 | 1855 | 5000 or more[(2)] |
| Inflammability (1.6 mm thick) |  | V-0 | V-0 | V-0 | V-0 | V-0 |

|  |  |  | Example 6 | Example 7 | Example 8 | Example 9 | Example 10 |
|---|---|---|---|---|---|---|---|
| Component (b) | Component (b-1) | parts by weight |  |  | 40 | 24 | 24 |
|  | Component (b-2) | parts by weight | 36 |  |  |  |  |
|  | Component (b-3) | parts by weight |  | 36 |  |  |  |
|  | Component (b-4) | parts by weight |  |  |  |  |  |
|  | Component (b-5) | parts by weight |  |  |  |  |  |
| Component (c) | Component (c-1) | parts by weight | 24 | 24 |  | 8 | 6 |
|  | Component (c-2) | parts by weight |  |  | 25 |  |  |
|  | Component (c-3) | parts by weight |  |  |  | 8 | 10 |
| Component (d) | Component (d-1) | parts by weight | 2.0 | 3.0 |  | 3 | 3 |
|  | Component (d-2) | parts by weight |  |  | 2.0 |  |  |
|  | Component (d-3) | parts by weight |  |  | 8.0 |  |  |
| Component (e) | Component (e-1) | parts by weight | 20 | 20 | 15 | 30 | 20 |
|  | Component (e-2) | parts by weight |  |  |  |  |  |
|  | Component (e-3) | parts by weight | 20 | 20 |  | 30 |  |
|  | Component (e-4) | parts by weight |  |  | 20 |  |  |
|  | Component (e-5) | parts by weight |  |  |  |  | 40 |
| Colorant (carbon black) |  | parts by weight | 0.8 | 0.8 | 0.8 | 0.8 | 0.8 |
| Vacuum degree of first vent hole |  | kPa | 35 | 60 | 20 | 15 | 15 |
| Component fed from first side feed opening |  |  | e-3 | e-3 | e-4 | e-3 | e-5 |
| Component fed from second side feed opening |  |  | e-1 | e-1 | e-1 | e-1 | e-1 |
| Vacuum degree of second vent hole |  | kPa | 35 | 60 | 20 | 15 | 60 |
| Number of shots made on and after which whitening on molding occurs |  |  | 5000 or more | 5000 or more | 5000 or more | 5000 or more | 5000 or more |
| Inflammability (1.6 mm thick) |  |  | V-0 | V-0 | V-0 | V-0 | V-0 |

[(1)]In the columns of the above table that show vacuum degree of vent holes, "blockade" indicates that the vent holes were blocked and not depressurized.
[(2)]For the materials which do not cause whitening on molding, 5000 injection shots were made and the number of shots was expressed by 5000 or more.
[(3)]The components (b) to (d) listed in the above table were fed from the first raw-material feed opening of the extruder.

TABLE 2

|  |  |  | Example 11 | Example 12 | Example 13 | Comparative example 1 | Comparative example 2 |
|---|---|---|---|---|---|---|---|
| Component (b) | Component (b-1) | parts by weight | 36 |  |  |  |  |
|  | Component (b-2) | parts by weight |  | 36 |  |  |  |
|  | Component (b-3) | parts by weight |  |  | 36 |  |  |
|  | Component (b-4) | parts by weight |  |  |  | 36 |  |
|  | Component (b-5) | parts by weight |  |  |  |  | 36 |
| Component (c) | Component (c-1) | parts by weight | 24 | 24 | 24 | 24 | 24 |
|  | Component (c-2) | parts by weight |  |  |  |  |  |
|  | Component (c-3) | parts by weight |  |  |  |  |  |
| Component (d) | Component (d-1) | parts by weight | 2.5 | 2.0 | 1.5 | 1.5 | 2.0 |
|  | Component (d-2) | parts by weight |  |  |  |  |  |
|  | Component (d-3) | parts by weight |  |  |  |  |  |
| Component (e) | Component (e-1) | parts by weight |  | 20 | 20 | 20 | 20 |
|  | Component (e-2) | parts by weight | 40 |  |  |  |  |
|  | Component (e-3) | parts by weight |  |  |  | 20 | 20 |
|  | Component (e-4) | parts by weight |  | 20 |  |  |  |
|  | Component (e-5) | parts by weight |  |  | 20 |  |  |
| Colorant (carbon black) |  | parts by weight | 0.8 | 0.8 | 0.8 | 0.8 | 0.8 |
| Vacuum degree of first vent hole |  | kPa | blockade[(1)] | 35 | 15 | blockade | atmospheric pressure[(2)] |
| Component fed from first side feed opening |  |  | e-2 | e-4 | e-5 | e-3 | e-3 |
| Component fed from second side feed opening |  |  | none | e-1 | e-1 | e-1 | e-1 |
| Vacuum degree of second vent hole |  | kPa | 15 | 35 | 15 | blockade | blockade |
| Number of shots made on and after which whitening on molding occurs |  |  | 2274 | 5000 or more[(3)] | 5000 or more | 87 | 101 |
| Inflammability (1.6 mm thick) |  |  | V-0 | V-0 | V-0 | V-1 | V-1 |

|  |  |  | Comparative example 3 | Comparative example 4 | Comparative example 5 | Comparative example 6 |
|---|---|---|---|---|---|---|
| Component (b) | Component (b-1) | parts by weight |  |  |  |  |
|  | Component (b-2) | parts by weight |  |  |  |  |
|  | Component (b-3) | parts by weight |  |  |  |  |
|  | Component (b-4) | parts by weight | 36 |  | 24 |  |
|  | Component (b-5) | parts by weight |  | 36 |  | 24 |

TABLE 2-continued

| Component (c) | Component (c-1) | parts by weight | 24 | 24 | 8 | 6 |
|---|---|---|---|---|---|---|
| | Component (c-2) | parts by weight | | | | |
| | Component (c-3) | parts by weight | | | 8 | 10 |
| Component (d) | Component (d-1) | parts by weight | 1.5 | 2.0 | 3 | 3 |
| | Component (d-2) | parts by weight | | | | |
| | Component (d-3) | parts by weight | | | | |
| Component (e) | Component (e-1) | parts by weight | 20 | 20 | 30 | 20 |
| | Component (e-2) | parts by weight | | | | |
| | Component (e-3) | parts by weight | 20 | 20 | 30 | |
| | Component (e-4) | parts by weight | | | | |
| | Component (e-5) | parts by weight | | | | 40 |
| Colorant (carbon black) | | parts by weight | 0.8 | 0.8 | 0.8 | 0.8 |
| Vacuum degree of first vent hole | | kPa | blockade | 35 | 15 | 15 |
| Component fed from first side feed opening | | | e-3 | e-3 | e-3 | e-5 |
| Component fed from second side feed opening | | | e-1 | e-1 | e-1 | e-1 |
| Vacuum degree of second vent hole | | kPa | 15 | 35 | 15 | 60 |
| Number of shots made on and after which whitening on molding occurs | | | 287 | 414 | 375 | 439 |
| Inflammability (1.6 mm thick) | | | V-1 | V-1 | V-1 | V-1 |

[1] In the columns of the above table that show vacuum degree of vent holes, "blockade" indicates that the vent holes were blocked and not depressurized.
[2] In the columns of the above table that show vacuum degree of vent holes, "atmospheric pressure" indicates that the vent holes were opened to atmospheric pressure (101.32 kPa) and not depressurized.
[3] For the materials which do not cause whitening on molding, 5000 injection shots were made and the number of shots was expressed by 5000 or more.
[4] The components (b) to (d) listed in the above table were fed from the first raw-material feed opening of the extruder.

TABLE 3

| | | Example 14 | Example 15 | Example 16 | Example 17 | Example 18 |
|---|---|---|---|---|---|---|
| First raw-material feed opening | Component (a) | a-1 | a-1 | a-1 | a-1 | a-2 |
| | Amount of component (a) blended (parts by weight) | 10 | 30 | 30 | 15 | 10 |
| | Component (b) | b-1 | | b-1 | b-1 | b-2 |
| | Amount of component (b) blended (parts by weight) | 23 | | 30 | 15 | 23 |
| | Component (c) | c-1 | c-1 | c-1 | c-1 | c-2 |
| | Amount of component (c) blended (parts by weight) | 440 | 30 | 30 | 30 | 40 |
| | Component (d) | d-1 | d-1 | d-1 | d-1 | d-1 |
| | Amount of component (d) blended (parts by weight) | 3 | 3 | 3 | 3 | 3 |
| | Component (f) | | f-2 | f-2 | f-2 | f-2 |
| | Amount of component (f) blended (parts by weight) | | 10 | 10 | 10 | 7 |
| First side feed opening | Component (a) | | | | | |
| | Amount of component (a) blended (parts by weight) | | | | | |
| | Component (b) | b-1 | b-1 | | b-1 | b-2 |
| | Amount of component (b) blended (parts by weight) | 27 | 30 | | 30 | 20 |
| Second side feed opening | Component (e) | | | | | |
| | Amount of component (e) blended (parts by weight) | | | | | |
| | Component (e) | | | | | |
| | Amount of component (e) blended (parts by weight) | | | | | |
| Physical properties | DTUL (° C.) | 162 | 147 | 144 | 149 | 155 |
| | Impact strength (J/m) | 13 | 130 | 85 | 133 | 110 |
| | Tensile strength (MPa) | 78 | 70 | 61 | 69 | 65 |
| Vacuum degree of first vent hole | kPa | blockade[1] | 30 | 20 | 65 | 70 |
| Vacuum degree of second vent hole | kPa | blockade | 30 | 20 | 65 | 70 |
| Number of shots made on and after which whitening on molding occurs | | 1724 | 5000 or more[2] | 5000 or more | 5000 or more | 5000 or more |

| | | Example 19 | Example 20 | Example 21 | Example 22 | Example 23 |
|---|---|---|---|---|---|---|
| First raw-material feed opening | Component (a) | a-3 | a-2 | a-2 | a-1 | a-2 |
| | Amount of component (a) blended (parts by weight) | 10 | 15 | 20 | 10 | 15 |
| | Component (b) | b-3 | b-1 | b-2 | b-1 | b-3 |
| | Amount of component (b) blended (parts by weight) | 23 | 25 | 20 | 15 | 15 |
| | Component (c) | c-3 | c-1 | c-1 | c-1 | c-2 |
| | Amount of component (c) blended (parts by weight) | 40 | 25 | 40 | 20 | 30 |

TABLE 3-continued

|  |  |  |  |  |  |  |
|---|---|---|---|---|---|---|
|  | Component (d) | d-2 | d-1 | d-1 | d-2 | d-1 |
|  | Amount of component (d) blended (parts by weight) | 5 | 7 | 3 | 5 | 3 |
|  | Component (f) | f-1 | f-1 |  | f-2 | f-2 |
|  | Amount of component (f) blended (parts by weight) | 12 | 15 |  | 5 | 5 |
| First side feed opening | Component (a) |  |  |  | a-1 |  |
|  | Amount of component (a) blended (parts by weight) |  |  |  | 10 |  |
|  | Component (b) | b-3 | b-1 | b-2 | b-1 | b-3 |
|  | Amount of component (b) blended (parts by weight) | 15 | 20 | 20 | 40 | 35 |
| Second side feed opening | Component (e) |  |  | e-1 | e-1 | e-1 |
|  | Amount of component (e) blended (parts by weight) |  |  | 20 | 40 | 20 |
|  | Component (e) |  |  | e-5 |  | e-6 |
|  | Amount of component (e) blended (parts by weight) |  |  | 25 |  | 20 |
| Physical properties | DTUL (° C.) | 154 | 136 | 201 | 209 | 188 |
|  | Impact strength (J/m) | 128 | 114 | 45 | 80 | 62 |
|  | Tensile strength (MPa) | 64 | 63 | 96 | 117 | 90 |
| Vacuum degree of first vent hole | kPa | 30 | 40 | 25 | 25 | 30 |
| Vacuum degree of second vent hole | kPa | 30 | 40 | 25 | 25 | 30 |
| Number of shots made on and after which whitening on molding occurs |  | 2895 | 5000 or more | 5000 or more | 5000 or more | 2671 |

[1] In the columns of the above table that show vacuum degree of vent holes, "blockade" indicates that the vent holes were blocked and not depressurized.
[2] For the materials which do not cause whitening on molding, 5000 injection shots were made and the number of shots was expressed by 5000 or more.
[3] The colorant, carbon black, was fed from the first raw-material feed opening in amount of 0.8 parts by weight.

TABLE 4

|  |  | Example 24 | Example 25 | Comparative example 7 | Comparative example 8 | Comparative example 9 | Comparative example 10 |
|---|---|---|---|---|---|---|---|
| First raw-material feed opening | Component (a) | a-1 | a-1 | a-1 |  | a-1 | a-1 |
|  | Amount of component (a) blended (parts by weight) | 10 | 15 | 10 |  | 30 | 15 |
|  | Component (b) |  | b-1 | b-1 | b-1 |  | b-1 |
|  | Amount of component (b) blended (parts by weight) |  | 35 | 23 | 30 |  | 15 |
|  | Component (c) | c-1 | c-1 | c-1 | c-1 | c-1 | c-1 |
|  | Amount of component (c) blended (parts by weight) | 30 | 10 | 40 | 30 | 30 | 30 |
|  | Component (d) | d-1/d-3 | d-1 |  | d-1 | d-1 |  |
|  | Amount of component (d) blended (parts by weight) | 3/5 | 3 |  | 3 | 3 |  |
|  | Component (f) | f-1 |  |  | f-2 | f-2 | f-2 |
|  | Amount of component (f) blended (parts by weight) | 5 |  |  | 10 | 10 | 10 |
| First side feed opening | Component (a) |  |  |  |  | a-1 |  |
|  | Amount of component (a) blended (parts by weight) |  |  |  |  | 30 |  |
|  | Component (b) | b-1 | b-1 | b-1 | b-1 |  | b-1 |
|  | Amount of component (b) blended (parts by weight) | 60 | 40 | 27 | 30 |  | 30 |
| Second side feed opening | Component (e) |  |  |  |  |  |  |
|  | Amount of component (e) blended (parts by weight) |  |  |  |  |  |  |
|  | Component (e) |  |  |  |  |  |  |
|  | Amount of component (e) blended (parts by weight) |  |  |  |  |  |  |

TABLE 4-continued

|  |  |  |  |  |  |  |  |
|---|---|---|---|---|---|---|---|
| Physical properties | DTUL (° C.) | 152 | 156 | 160 | 154 | 130 | 142 |
|  | Impact strength (J/m) | 146 | 11 | 7 | 38 | 120 | 24 |
|  | Tensile strength (MPa) | 74 | 77 | 38 | 50 | 53 | 34 |
| Vacuum degree of first vent hole | kPa | 25 | blockade[1] | 40 | 30 | 20 | 20 |
| Vacuum degree of second vent hole | kPa | 25 | blockade | 40 | 30 | 20 | 20 |
| Number of shots made on and after which whitening on molding occurs |  | 5000 or more[2] | 1432 | 5000 or more | 5000 or more | 5000 or more | 5000 or more |

|  |  | Comparative example 11 | Comparative example 12 | Comparative example 13 | Comparative example 14 |
|---|---|---|---|---|---|
| First raw-material feed opening | Component (a) |  | a-2 | a-1 | a-1 |
|  | Amount of component (a) blended (parts by weight) |  | 15 | 10 | 10 |
|  | Component (b) | b-1 | b-3 | b-4 | b-5 |
|  | Amount of component (b) blended (parts by weight) | 25 | 15 | 23 | 23 |
|  | Component (c) | c-1 | c-2 | c-1 | c-1 |
|  | Amount of component (c) blended (parts by weight) | 20 | 30 | 40 | 40 |
|  | Component (d) | d-2 |  | d-1 | d-1 |
|  | Amount of component (d) blended (parts by weight) | 5 |  | 3 | 3 |
|  | Component (f) | f-2 | f-2 |  |  |
|  | Amount of component (f) blended (parts by weight) | 5 | 5 |  |  |
| First side feed opening | Component (a) |  |  |  |  |
|  | Amount of component (a) blended (parts by weight) |  |  |  |  |
|  | Component (b) | b-1 | b-3 | b-4 | b-5 |
|  | Amount of component (b) blended (parts by weight) | 50 | 35 | 27 | 27 |
| Second side feed opening | Component (e) | e-1 | e-1 |  |  |
|  | Amount of component (e) blended (parts by weight) | 40 | 20 |  |  |
|  | Component (e) |  | e-6 |  |  |
|  | Amount of component (e) blended (parts by weight) |  | 20 |  |  |
| Physical properties | DTUL (° C.) | 194 | 170 | 162 | 162 |
|  | Impact strength (J/m) | 39 | 33 | 10 | 9 |
|  | Tensile strength (MPa) | 119 | 63 | 74 | 76 |
| Vacuum degree of first vent hole | kPa | 20 | 30 | 30 | 20 |
| Vacuum degree of second vent hole | kPa | 20 | 30 | 30 | 20 |
| Number of shots made on and after which whitening on molding occurs |  | 5000 or more | 2144 | 203 | 179 |

[1]In the columns of the above table that show vacuum degree of vent holes, "blockade" indicates that the vent holes were blocked and not depressurized.
[2]For the materials which do not cause whitening on molding, 5000 injection shots were made and the number of shots was expressed by 5000 or more.
[3]The colorant, carbon black, was fed from the first raw-material feed opening in amount of 0.8 parts by weight.

TABLE 5

|  |  | Example 26 | Example 27 | Example 28 | Example 29 | Example 30 | Example 31 |
|---|---|---|---|---|---|---|---|
| First raw-material feed opening | Component (a) | a-1 | a-1 | a-1 | a-1 | a-1 | a-1 |
|  | Amount of component (a) blended (parts by weight) | 30 | 30 | 30 | 30 | 30 | 30 |
|  | Component (b) |  |  |  |  |  |  |
|  | Amount of component (b) blended (parts by weight) |  |  |  |  |  |  |
|  | Component (c) | c-1 | c-1 | c-1 | c-1 | c-1 | c-1 |
|  | Amount of component (c) blended (parts by weight) | 30 | 30 | 30 | 30 | 30 | 30 |

TABLE 5-continued

|  |  | Example 26 | Example 27 | Example 28 | Example 29 | Example 30 | Example 31 |
|---|---|---|---|---|---|---|---|
|  | Component (d) | d-1 | d-1 | d-1 | d-1 | d-1 | d-1 |
|  | Amount of component (d) blended (parts by weight) | 3 | 3 | 3 | 3 | 3 | 3 |
|  | Component (f) | f-2 | f-3/f-4 | f-3/f-5 | f-4/f-6 | f-3/f-7 | f-3/f-8 |
|  | Amount of component (f) blended (parts by weight) | 10 | 2/8 | 2/8 | 8/2 | 4/6 | 4/6 |
| First side feed opening | Component (a) Amount of component (a) blended (parts by weight) |  |  |  |  |  |  |
|  | Component (b) | b-1 | b-1 | b-1 | b-1 | b-1 | b-1 |
|  | Amount of component (b) blended (parts by weight) | 30 | 30 | 30 | 30 | 30 | 30 |
| Second side feed opening | Component (e) Amount of component (e) blended (parts by weight) |  |  |  |  |  |  |
|  | Component (e) Amount of component (e) blended (parts by weight) |  |  |  |  |  |  |
| Mold release agent[3] | Amount of component (g) blended (parts by weight) | 0.1 | 0.1 | 0.1 | 0.1 | 0.1 | 0.1 |
| Content of bound vinyl aromatic compound in component (f) (% by weight) |  | 35 | 33 | 33 | 33 | 34 | 34 |
| Physical properties | DTUL (°C.) | 146 | 147 | 146 | 145 | 145 | 146 |
|  | Impact strength (J/m) | 130 | 177 | 183 | 164 | 192 | 189 |
|  | Tensile strength (MPa) | 71 | 75 | 73 | 73 | 76 | 77 |
| Vacuum degree of first vent hole | kPa | 30 | 30 | 30 | 30 | 30 | 30 |
| Vacuum degree of second vent hole | kPa | 30 | 30 | 30 | 30 | 30 | 30 |
| Number of shots made on and after which whitening on molding occurs |  | 5000 or more[1] | 5000 or more | 5000 or more | 5000 or more | 5000 or more | 5000 or more |

[1]For the materials which do not cause whitening on molding, 5000 injection shots were made and the number of shots was expressed by 5000 or more.
[2]The colorant, carbon black, was fed from the first raw-material feed opening in amount of 0.8 parts by weight.
[3]As a mold release agent, the component (g) and other additives were mixed into the pellets and fed to the injection molding machine.

INDUSTRIAL APPLICABILITY

The resin composition of the present invention provides a molded article that is free from whitening on the surface, exhibits excellent surface appearance and inflammability, and has excellent heat resistance and a balance between toughness (impact strength) and mechanical strength when molded. Thus, it can be utilized as at least one molded component or part selected from the group consisting of chassis or cabinets for compact disc read-only memory (CD-ROM), digital versatile disc read-only memory (DVD-ROM), compact disc-recordable (CD-R), digital versatile disc-recordable -R standard (DVD-R), digital versatile disc-recordable +R standard (DVD+R), compact disc rewritable (CD-RW), digital versatile disc-rewritable -R standard (DVD-RW), digital versatile disc-rewritable +R standard (DVD+RW) or digital versatile disc random-access memory (DVD-RAM); mechanical components for optical instruments, such as optical pick-up slide bases; periphery parts for light source lamps; sheets or films for metal-film laminated substrates; internal parts for hard discs; connector ferrules for optical fibers; internal parts for laser beam printers; internal parts for ink jet printers; internal parts for copiers; internal parts for automotive engine rooms such as automotive radiator tank parts; and automotive lamp parts.

The invention claimed is:

1. A resin composition, comprising:
45 to 99 parts by weight of a polyphenylene sulfide resin composed of 0 to 33% by weight of a component (a) as a linear polyphenylene sulfide resin extracted with methylene chloride in an amount of 0.7% by weight or less and having an —SX group, wherein S represents a sulfur atom, and X represents an alkaline metal or a hydrogen atom, in an amount of 20 μmol/g or more, and 100 to 67% by weight of a component (b) as a crosslinked polyphenylene sulfide resin having an oligomer extracted with methylene chloride in an amount of 1% by weight or less and having a volatile content collected in a molten state at 320° C. of 1000 ppm or less;
55 to 1 parts by weight of a component (c) as a polyphenylene ether resin; and
a component (d) as a styrene copolymer and/or an ethylene copolymer having either a glycidyl group or an oxazolyl group as a functional group in an amount of 1 to 20 parts by weight per 100 parts of the components (a) to (c) in total.

2. The resin composition according to claim 1, wherein the polyphenylene sulfide resin is composed of 1 to 33% by weight of the component (a) and 99 to 67% by weight of the component (b).

3. The resin composition according to claim 2, comprising 45 to 85 parts by weight of the polyphenylene sulfide resin and 55 to 15 parts by weight of the component (c).

4. The resin composition according to claim 2, further comprising a component (f) as an impact-resistance imparting agent in an amount of 5 to 30 parts by weight per 100 parts by weight of the components (a) to (d) in total.

5. The resin composition according to claim 4, wherein the component (f) is at least one selected from the group consisting of a block copolymer obtained by copolymerizing a vinyl aromatic compound with a conjugated diene compound, a hydrogenated block copolymer obtained by further hydrogenating the block copolymer, the block copolymer or the hydrogenated block copolymer having at least one functional group selected from the group consisting of a hydroxyl group, carboxyl group, acid anhydride group, ester group, epoxy group, oxazolyl group and amino group, an ethylene/α-olefin copolymer, and the ethylene/α-olefin copolymer having at least one functional group selected from the group consisting of a hydroxyl group, carboxyl group, acid anhydride group, ester group and amino group.

6. The resin composition according to claim 4, comprising 5 to 30 parts by weight of the component (f), wherein the component (f) is composed of:
   a component (f1) as a hydrogenated block copolymer consisting of at least one polymer block A which contains a vinyl aromatic compound as a main constituent and at least one polymer block B which contains a conjugated diene compound, wherein the bound vinyl aromatic compound is contained in an amount of 55 to 95% by weight;
   a component (f2) as a hydrogenated block copolymer consisting of a polymer block A which contains a vinyl aromatic compound as a main constituent and at least one polymer block C which contains a conjugated diene compound as a main constituent, wherein the bound vinyl aromatic compound is contained in an amount of 1 to less than 55% by weight; and/or
   a component (f3) as an olefin elastomer, and
   the content of the bound vinyl aromatic compound in the component (f) is 20 to 55% by weight.

7. The resin composition according to claim 6, wherein the at least one polymer block B of the component (f1) is a random copolymer of a conjugated diene compound with a vinyl aromatic compound.

8. The resin composition according to any one of claims 1 to 3, further comprising a component (e) as an inorganic filler in an amount of 20 to 400 parts by weight per 100 parts by weight of the components (a) to (d) in total.

9. The resin composition according to claim 4, wherein the component (e) is at least one selected from the group consisting of a glass fiber, carbon fiber, carbon nanotube, alumina fiber, silicon carbide fiber, ceramic fiber, gypsum fiber, metal fiber, potassium titanate whisker, calcium carbonate, porous calcium carbonate, calcium carbonate whisker, hydrotalcite, kaolin, clay, calcium silicate, carbon black (including conductive carbon), titanium oxide, hydrotalcite, magnesium oxide, aluminum oxide, calcium oxide, fly ash (limestone), wollastonite, glass beads, glass flakes, mica, talc, graphite, aluminum nitride, boron nitride and molybdenum disulfide.

10. The resin composition according to claim 1, wherein the components (a) and (b) have a melt viscosity of 1 to 10000 poise each.

11. The resin composition according to claim 1, wherein the component (c) is composed of polyphenylene ether in an amount of 100% by weight, or is composed of polyphenylene ether in an amount of 1 to 99% by weight and a styrene resin in an amount of 99 to 1% by weight.

12. The resin composition according to claim 1, wherein the component (d) is at least one selected from the group consisting of a styrene-glycidyl methacrylate copolymer, a styrene-glycidyl methacrylate-methyl methacrylate copolymer, a styrene-glycidyl methacrylate-acrylonitrile copolymer, a styrene-vinyloxazoline copolymer, a styrene-vinyloxazoline-acrylonitrile copolymer, an ethylene-glycidyl methacrylate copolymer, an ethylene-acrylic ester-glycidyl methacrylate copolymer, an ethylene-vinyl acetate-glycidyl methacrylate copolymer, a graft copolymer of an ethylene-glycidyl methacrylate copolymer with a styrene monomer grafted thereonto, and a graft copolymer of an ethylene-glycidyl methacrylate copolymer with a styrene monomer and acrylonitrile grafted thereonto.

13. A process for preparing a resin composition according to claim 1, comprising: melt-kneading the components (a) to (d) using a twin-screw extruder which has at least 2 vent holes and at least one side feed opening and whose temperature has been set at 280° C. or higher; and then melt-kneading the components while performing venting through the one or more vent holes of the twin-screw extruder at an absolute vacuum pressure of 95 kPa or lower.

14. The process for preparing a resin composition according to claim 13, wherein the polyphenylene sulfide resin is composed of 1 to 33% by weight of the component (a) and 99 to 67% by weight of the component (b), the weight ratio of the component (c) to the polyphenylene sulfide resin is 70/30 or less, and, when the two vent holes are referred to as a first vent hole and a second vent hole, respectively, the venting is performed through the first vent hole, then any remaining polyphenylene sulfide resin is fed and melt-kneaded in the presence of the melt-kneaded material having passed through the first vent hole, and the venting is then performed through the second vent hole.

15. The process for preparing a resin composition according to claim 14, wherein the whole amount of the component (f) as an impact-resistance imparting agent is fed together with the whole amount of the component (d).

16. The process for preparing a resin composition according to claim 13, wherein the component (e) as an inorganic filler is fed in the presence of the melt-kneaded material consisting of all the components (a) to (d) in an amount of 20 to 400 parts by weight per 100 parts by weight of the components (a) to (d) in total and melt-kneaded, and then venting is performed through the second vent hole of the twin-screw extruder at an absolute vacuum pressure of 95 kPa or lower.

17. A resin composition obtained by the preparation process according to claim 13.

18. The resin composition according to claim 1, which is used as a molding material for mechanical components for optical instruments, periphery parts for light source lamps, sheets or films for metal-film laminated substrates, internal parts for hard discs, connector ferrules for optical fibers, printer parts, copier parts, automotive lamp parts, automotive radiator tank parts, or internal parts for automotive engine rooms.

* * * * *